(12) United States Patent
Mahalingaiah

(10) Patent No.: US 6,754,214 B1
(45) Date of Patent: Jun. 22, 2004

(54) COMMUNICATION NETWORK HAVING PACKETIZED SECURITY CODES AND A SYSTEM FOR DETECTING SECURITY BREACH LOCATIONS WITHIN THE NETWORK

(75) Inventor: Rupaka Mahalingaiah, Austin, TX (US)

(73) Assignee: Dunti, LLC, Austin, TX (US)

( * ) Notice: Subject to any disclaimer, the term of this patent is extended or adjusted under 35 U.S.C. 154(b) by 0 days.

(21) Appl. No.: 09/356,651

(22) Filed: Jul. 19, 1999

(51) Int. Cl.[7] .............................. H04L 12/28; H04L 9/00
(52) U.S. Cl. .................. 370/392; 370/400; 713/153
(58) Field of Search ................................. 713/153, 160, 713/201; 370/389, 392, 400, 401, 474, 393; 709/227

(56) References Cited

U.S. PATENT DOCUMENTS

| | | | |
|---|---|---|---|
| 4,538,026 A | | 8/1985 | Yasue |
| 5,095,480 A | | 3/1992 | Fenner |
| 5,175,765 A | * | 12/1992 | Perlman ..................... 370/428 |
| 5,442,708 A | * | 8/1995 | Adams et al. .............. 713/153 |
| 5,485,455 A | | 1/1996 | Dobbins et al. |
| 5,509,000 A | * | 4/1996 | Oberlander ................. 370/409 |
| 5,548,646 A | * | 8/1996 | Aziz et al. .................. 713/153 |
| 5,596,715 A | | 1/1997 | Klein et al. |
| 5,721,819 A | | 2/1998 | Galles et al. |
| 5,757,924 A | * | 5/1998 | Friedman et al. ........... 713/151 |
| 5,864,683 A | | 1/1999 | Boebert et al. |
| 5,884,024 A | * | 3/1999 | Lim et al. ................... 713/201 |
| 6,006,272 A | * | 12/1999 | Aravamudan et al. ...... 709/245 |
| 6,119,171 A | | 9/2000 | Alkhatib |
| 6,185,680 B1 | * | 2/2001 | Shimbo et al. ............. 713/160 |
| 6,307,837 B1 | * | 10/2001 | Ichikawa et al. ........... 370/230 |
| 6,389,532 B1 | * | 5/2002 | Gupta et al. ................ 370/351 |
| 6,412,007 B1 | * | 6/2002 | Bui et al. .................... 709/227 |

FOREIGN PATENT DOCUMENTS

| | | |
|---|---|---|
| EP | 0 403 973 | 12/1990 |
| EP | 0 751 642 | 1/1997 |
| EP | 0 855 820 | 7/1998 |

OTHER PUBLICATIONS

Xedia Corp., "Demystifying Bandwidth Management," www.xedia.com/products/demystify.htm, last modified: Feb. 22, 1999.
Xedia Corp., "CBQ Frequently–Asked Questions," www.xedia.com/products/cbq_faq.htm, last modified: Mar. 11, 1999.

(List continued on next page.)

Primary Examiner—Chau Nguyen
Assistant Examiner—Andy Lee
(74) Attorney, Agent, or Firm—Kevin L. Daffer; Conley Rose P.C.

(57) ABSTRACT

Architectures, systems, and methods are provided for securing and prioritizing packets of data sent through a communication network. Each packet is assigned a security code and priority code as it enters the network. The security code or priority code may remain the same or change as it travels from node-to-node across the network. By assigning security and priority codes to each packet, maximum bandwidth allocation can be achieved among the nodes in a packet-switched environment. The assigned security and priority codes enter and travel through the network according to modules which have a hierarchical class or grouping. Thus, the security and priority information may be sent solely within one class or among classes depending on where, within the classes the data path exists. In this manner, a specified quality of service can be achieved to ensure the data path is secured dynamically as it travels from node to node, and also to determine which packet among several is to be forwarded across a shared resource of that network.

6 Claims, 11 Drawing Sheets

OTHER PUBLICATIONS

Xedia Corp., "Delivering Internet Access Quality of Service," www.xedia.com/products/delivering_access.htm, last modified: Mar. 15, 1999.

Antonio et al., "A Fast Distributed Shortest Path Algorithm for a Class of Hierarchically Structured Data Networks,"© 1989 IEEE, pp. 183–192.

Tsuchiya, "Efficient Utilization of Two–Level Hierarchical Addresses," ©1992 IEEE, pp. 1016–1021.

International Search Report, application No. PCT/US 00/13334, mailed Mar. 23, 2001.

* cited by examiner

COMMUNICATION NETWORK HAVING PACKETIZED SECURITY CODES AND A SYSTEM FOR DETECTING SECURITY BREACH LOCATIONS WITHIN THE NETWORK

BACKGROUND OF THE INVENTION

1. Field of the Invention

This invention relates to a communication system ("network") and more particularly to a network of structurally organized nodes which can identify secured access to the network, forward data across the network according to security levels, reject unsecured accesses, authorize transmission from the network, and detect network locations undergoing security violations.

2. Description of the Related Art

A communication network is generally regarded as an interconnected set of subnetworks or subnets. The network can extend over localized subnets as an intranet, or can extend globally as an internet between one or more intranets. A communication network can therefore forward data within a localized network between termination devices extending to almost anywhere around the world. The termination devices include any data entry/retrieval system (e.g., telephone or computer), and a network includes a local and/or global interconnection of termination devices configured on one or more subnets.

The basic underpinnings of network operation is the various protocols used to communicate across the network. A popular foundation for those protocols is the Open System Interconnect ("OSI") model. Using that model or a derivative thereof, protocols can be developed which work in concert with each other. A popular communication protocol includes the Transmission Control Protocol ("TCP") and the Internet Protocol ("IP"). TCP/IP are used in networks that are known as packet-switched networks. The advent of asynchronous transfer mode ("ATM") has brought about a divergence from packet-based standards to one using a cell-switched network. Packet-switched and cell-switched networks are in contrast with circuit-switched networks, such as the telephone system. As opposed to maintaining a fixed routing connection for the transmitted message, packet or cell switching evenly allocates or "switches" packet or cell portions of the message across dissimilar routes of the network. The term packet switching henceforth refers generically to switching message portions, regardless of whether that portion is a cell or packet.

In a packet-switched network, each packet of a particular message may be sent across different routes of the network at the same time and then reassembled at the proper termination device. In order to ensure the packets are properly received, certain layers of the OSI protocol stack will wrap the data before the data is sent across the network. For example, TCP can divide data into segments which are then placed into, for example, IP datagrams having a header which includes the IP address of the originating and receiving termination devices. It is not until the IP has been wrapped possibly several times will the TCP be forwarded across the network.

An important aspect of network management and administration is the need to control accesses to the network infrastructure. Accesses can be controlled for numerous reasons, some of which include security and prioritization. Security deals with restricting improper accesses, while prioritization deals with prioritizing an access to a shared resource.

There are various ways in which to secure a communication network, all of which deal with mechanisms which prevent unauthorized access to packets of data, such access is often referred to as "packet sniffing" and/or "packet spoofing". Common security mechanisms include use of firewalls implemented in hardware and software (e.g., proxy servers, bastion hosts, filtering routers) and/or authentication systems implemented in solely in software (e.g., passwords and encryption code). Most firewalls use some form of screening subnet architecture that analyzes the incoming internet packet to determine if that packet should be placed on the internal, intranet structure. Analyzing the packet and, more specifically, the source and destination of that packet, typically adds a lag time or latency at the interface between the intranet and the internet Placing an encryption code also adds overhead to the packet and involves time-consumptive decryption at the receiving end of the network. Use of passwords appears less consumptive of transmission bandwidth. Passwords, however, can sometimes be readily broken either through a user's improper choice of password name or through a hacker sending thousands of user names and passwords until a successful combination is achieved.

It would be of benefit to secure a network without requiring the overhead of conventional firewalls. For example, eliminating routing tables within either an interior or exterior filtering router, eliminating a dedicated network of a bastion host, eliminating encryption bits and decryption, and eliminating user-specified passwords would prove beneficial if the same level (or possibly a higher level) of security could be maintained. An improved level of security which avoids conventional firewalls is preferably one based on an analysis of each packet as the packets are switched throughout the network. Analysis on each packet could desirably be performed without requiring a circuit-switched path or dedicated, private path such as those found in private lines and/or Virtual Private Lines ("VPLs") attributable to a Virtual Private Network ("VPN"). VPNs and circuit-switched networks impose significant limitations on bandwidth utilization and network throughput and therefore should be avoided as a security solution.

Modern day networks are expected not only to be highly secure, but also to support numerous types of applications, some of which may require greater bandwidth than others. Other applications may require deterministic response time across the network. Network managers may be required to adapt the network, or at least portions of the network, so that it can guarantee a predetermined amount of bandwidth and/or propagation time for a requested Quality Of Service ("QOS"). The term "QOS" generally subsumes all the various terms used to describe "accesses" between a pair of termination devices. Access is therefore a term that can be quantified to include the speed and degree of security by which packets travel between termination devices and the fault tolerance measures which ensure the transmitted signal is clear and accurate.

The network manager may require, for example, fast, highly secure communication between termination devices residing on a local intranet, whereby the termination devices are sending both voice and video in a time-sensitive manner. There may be other intranets, however, that are not sending time-sensitive information, each of which may be connected to the intranet allocated to higher speed. The network manager may therefore need to give priority to packets sent (or received) to and from some, but not all, termination devices within the network. In other words, a need exists for allocating bandwidth through a shared resource such as a network link, switch or router, or arbitrating among competing devices that are requesting various types of accesses to the shared resource.

Conventional QOS, however, cannot provide an accurate determination of a delay (i.e., response time) between a request sent by a termination device and a response returned to that device. For instance, the transmission delay varies depending on whether the routing table portion of interest resides in the control processor cache or is within the system memory linked to the control processor by a system memory bus. Time needed to access the routing tables will therefore vary across the network leaving uncertainty as to when the requested packets will be returned to the requesting agent. Thus, conventional QOS solutions cannot guarantee response times even though a specific class of service has been designated. Instead, QOS is limited to determining availability and reliability of the transmission path not, e.g., worst case response time.

It would be of benefit to be able to specify a QOS and to designate classes of service for certain accesses within the network based on the time-sensitive nature by which the applications must operate. The benefit would be derived in designating certain nodes according to a structure and to guarantee worst case response time between those nodes based on the classes of service and reserved bandwidth unique to those nodes. The desired QOS would benefit by implementing packet-based classes of services. The classes of service might beneficially extend to security codes attributed to those classes so that not only could performance be assured, but also security.

SUMMARY OF THE INVENTION

The problems outlined above are in large part solved by a network that is structured according to where packets are routed within the network. The structure can be associated with geographic routing or use-type routing, or any other associative routing where certain nodes are grouped in a hierarchy, or structured level, different from other nodes. For example, a group of nodes associated with a local area network (LAN) may have a hierarchical designation different from another group of nodes of a subnet outside the LAN. The structured network transmits data according to a packet-switching protocol and employs QOS to assign priority, performance and security to the packets as they travel across the structured network.

The network includes a plurality of forwarding modules linked together between termination devices. Within one or more of the modules is a mapping table which assigns a priority code and/or security code to the packet depending on, say, an address from which the packet of data was sent. The address can be that of another forwarding module earlier in the data flow path, or a termination device used to input data into the network. The address can further be a user level differentiator within a terminating device.

The forwarding module can forward or direct packets of data placed in various protocols, including IP, ATM, IPX, DEC, NET, Apple Talk, etc. The modules are arranged as nodes: they are topologically related to one another based on their position within the network, the destination routing path, and/or their use. The modules, due to an awareness of their position or location, allow adaptive fast forwarding of packets across the network. The modules represent an improvement over conventional switches and/or routers. Instead of statically routing packets in the same manner each time, as in switches, the modules include some features of conventional routers, yet without the lag time of routing table look up. The modules can forward or direct packets of data relatively fast (similar to conventional switches), and can dynamically change the forwarding path based on activity within the network (similar to conventional routers).

Groupings of modules can be designated to a specified class or hierarchical level. Each module is preferably assigned a unique identification number possibly relating, in part, to the hierarchical level of the network. For example, the most significant field of bits may be allocated to the highest hierarchical level of modules, followed by the next most significant field allocated to next highest level of modules. With each level of hierarchy, structure is provided. The modules are organized according to some predetermined structure within a given hierarchical level which is reflected in the field of the identification number corresponding to that level. Distributed routing can therefore be achieved by comparing a destination address of the wrapped packet with identification numbers of those hierarchical levels depending on the location of the module receiving the incoming packet. Modules therefore determine the directional flow of the incoming packet based on comparing (or decoding) the destination address of the packet with the relative position of the module indicated by the module's identification number. As the result of this direction/forwarding operation, traditional routing methods are eliminated. Also, decoding operations eliminate routing in what was determined, at a higher hierarchical level, to be an unused path. Decoding within lower levels can be restricted only to those modules that the higher levels point toward. Moreover, decoding can be accomplished in a fairly rapid manner and need not occur if a comparison at the higher level will direct the packet to another branch of lower level modules. Accordingly, the structured network can be thought of as having a relative or deterministic routing topography absent the detriments of conventional routers. Hence the deterministic routing acts as a distributed router. Instead of performing routing functions at every node in the network, the distributed router performs incremental routing functions at every node and the data forwarding function is achieved across the entire network. It is important to note that the structured network hereof can form the entirety of the intranet and internet network, or form simply a portion of a conventional (non-structured) intranet/internet network. Thus, the structured network can extend between termination devices, or simply as a portion of a conventional network that extends between termination devices.

The modules can be classified as an end module, a pass-through module, or an intermediate module. The end module are those that are configured adjacent termination devices and are used to perform protocol wrapping functions as packets enter the structured network or strip protocol when packets exit the network. The end modules also perform a routing function similar to intermediate modules or pass-through modules. The modules can be configured in hardware to be substantially the same, with only, the programmed function being different based on where within the network the module will be placed. Each module includes a minimum of one bi-directional port and a traffic manager which controls the port or ports. The traffic manager includes a decoder and various buffers. The decoder performs a comparison between a destination address and the identification number of that module based on the position of that module within the overall structured network.

The structured network is one that is compatible with protocols currently used in, for example, the OSI model. Through a series of read or fetch operations, the traffic manager reads wrap information from a buffer within the entry module and assigns that wrap information to the incoming packet. The wrap information simply appends a header and optionally a trailer to the packet, transparent to the protocol of the incoming packet. When the packet arrives upon the exit module, wrap information is stripped from the original packet and a relatively small mapping table may be used to forward the packet to the appropriate destination termination device. The packet is therefore forwarded throughout the structured network from the entry module to the exit module without having to perform conventional look-up operations. The wrap information includes the security code and the priority code assigned to the entry module either by virtue of the identification number of the incoming packet, identification of the entry module, or the hierarchical/structural level assigned to the entry module.

Both the security code and the priority code are placed within the header of each individual packet so as to assign a QOS on a packet-by-packet basis. The added flexibility of assigning QOS to each packet not only enhances the dynamics of resource allocation over a relatively short period of time, but also establishes a packet-switched security network. The network is a structured network that is setup and controlled independent of the data flow path. By separating the data flow path from control and setup including QOS control, it can be assured that security features (packet sniffing and packet spoofing) are substantially eliminated at each module since accesses via the. network data flow path to control information cannot be achieved.

Each module can be setup to send or accept packets originating from or addressed to specific modules of the structured network. Thus, each module can be assigned a security code that is placed on the packet traversing that module, and the downstream module will either grant access or deny access based on security code placed upstream. This allows for private line type security services with guaranteed private access, but within a packet-switched environment without having to dedicate a circuit or path in times when the circuit or path is not being used. The modules can be programmed to only pass certain classes of messages based again on the security class of the originating, or upstream, module as designated by the identification number of that module and/or the security code assigned to that module. Along with the header, a trailer may be added to the packet to note if a security breach has occurred somewhere within the secured network, and the location of that breach—either packet sniffing or packet spoofing at a particular module having a unique identification number or security code.

In some instances, unique security code can be assigned to each module. In other instances, there could be a unique identification number for each module and several security codes assigned to groupings of modules based on the secured status or class of those grouped modules. The same applies to the priority code also.

The exit end module may contain one or more mapping tables selectable by the security code transferred with the packet that arrives on the exit end module. The selected mapping table contains a grouping of identification numbers attributed to the upstream module or the entry end module. If the identification number forwarded with the packet matches with an identification number in the selected table, then it is known that the termination device connected to the exit end module is authorized to receive the packet arriving upon the exit end module.

The entry end module and the exit end module provide security identification and security authorization. Optionally, the trailer placed upon the packet can include the number of modules traversed and the identification number of each module. If the count number of modules traversed does not equal the identification number entries, then a security breach is detected and, based on the user's configuration data, isolation of the breached identification number can be determined. From that identification number, an access violation can be pinpointed to a specified module and therefore a termination device connected to that module.

The entry or intermediate module may also assign a priority code based on the incoming identification number of either a termination device, a user from a termination device, or an upstream module and the bandwidth allocated to that upstream module or termination device. For a specified bandwidth allocation, priority is given depending on whether the incoming packets of data exceed or are less than the allocated bandwidth. The entry or intermediate module will select incoming packets from dissimilar nodes upon the shared resource (interconnect bus or link) depending on the priority code of the incoming packet. If one packet priority code is higher than the other, than the module will operate as an arbiter and select the higher priority packet based on one of numerous types of arbitration schemes.

Both priority codes and security codes can be assigned to modules according to various hierarchical levels of the network, each level being assigned based on where the nodes or modules are arranged structurally relative to one another within the network. For example, the highest priority level may be attributed to a single loop of interconnected modules needing significant bandwidth resources for use in videoconferencing applications, whereas a lower priority may be assigned to packets destined to one or more modules of another loop where voice transmission is all that is needed, both loops possibly connected to form a multi-loop subnet.

According to one embodiment, a communication network is provided having a plurality of forwarding modules. The modules can be classified as entry modules, intermediate modules, or end modules. It should be noted that an entry module can be an intermediate module as well as end module for packets originating from other modules in the network. An entry module can be used to determine if data coming into the entry module will be transferred as secured data to the communication network. The entry module can include a decoder coupled to receive an identification number of an entry device and data from that device. A storage device may be further included within the entry module and configured with a set of bits. A compare unit of the entry module may be coupled between the decoder and the storage device for comparing the identification number with the set of bits to determine if the data will be transferred as secured data. The entry device can be a node within another communication network, or a termination device. The storage device may include a register or any temporary storage unit. The identification number can be thought of as an address unique to the entry device.

The entry module may further include a buffer containing a security code and a traffic controller coupled to the buffer. The traffic controller may read the security code from the buffer and place the security code and identification number within a packet comprising the forwarded data. A counter may be used to count the number of accesses upon the entry module by the entry device and block further accesses if a count value exceeds a value stored within the storage device. The entry module may further include a mapping table coupled to map the incoming identification number to a corresponding security code. The incoming data is arranged within a single packet and the secured data is transferred to the communication network on a packet-by-packet basis.

An exit module of the communication network may include an output port adapted to receive a packet of data having a header. The header includes a security code and an identification number. A storage device is contained within the exit module and comprises a plurality of tables, one of which may be selected by the security code of the packet header. The exit module may also include a compare unit coupled between the output port and the storage device for comparing the identification number with entries within the selected table to determine if the identification number derives from a secured path that extends at least partially through the communication network. As such, the tables are used to authorize transmission of a secured packet through a termination device coupled to the exit module. The table may also be used to assure that the identification number of the entry module, or an intermediate module, has assigned to it a security code of a proper hierarchical level. The packet is either secured or not secured and, if secured, the exit module confirms security before sending the secured packet to a termination device that can read the packet.

The secured path thereby extends from a secured module within the communication network. The secured module is one having been assigned the security code and the identification number and placed the code within a header of a packet received by the exit module output port. A decoder within the exit module may be used to decode a grouping of bits within the security code to select one of a plurality of tables. According to one example, the grouping of bits may be selected as the most significant bits within the security code.

A decoder within intermediate forwarding modules forces a secure packet to be forwarded only when there is a security code mismatch of the incoming packet with its security tap enable. These forces secure broadcast packets to be visible to only other modules within the network that are authorized to receive this particular secure broadcast transmission. Similarly, if a secure packet is destined to a non-secure module, the packet will be rejected by the exit node decoder to prevent a security breach.

Each identification number is preferably a unique number and the security codes are assigned according to their security level or class of service. That is, a grouping of modules that are related to one another may have the same security code, but dissimilar from a security code of another grouping placed within the same network, or which control routing to dissimilar locations. The entry module may be coupled to assign and transfer a security code and an identification number to a packet of data. An exit compare unit within the exit module is coupled to receive the packet of data and compare the security code and the identification number before transferring the packet of data from the communication network. Each of the intermediate modules may also include a storage device containing a security code and a compare unit coupled to receive an incoming packet and compare the incoming security code against the security code of the intermediate module to define a secured path through the communication network.

The entry modules, intermediate modules, and exit modules are generically referred to as "forwarding modules." Each forwarding module includes an input port coupled to receive an incoming packet of data. A forwarding module can also include a mapping table which assigns a priority code to the packet depending on the address from which the packet of data was sent. The address is defined as the identification node of the upstream termination device or module. According to one example, the priority code is assigned depending on an amount of bandwidth allocated to a section of the data flow path to which the packet of data is forwarded from the module. The amount of bandwidth may include an allocated transmission speed of that section of data flow path. The priority code may be maintained for a plurality of successive packets provided the number of bits forwarded per second by the plurality of successive packets is less than the allocated transmission speed. The priority and/or security code may also be maintained for a plurality of forwarding nodes resulting in segment based priority and/or security transmission.

Thus, in addition to providing packet-by-packet security codes and identification numbers, the communication network also provides packet-by-packet priority codes. Similar to security, priority can be assigned based on various factors, such as the overall structure of the network, levels of structure, interrelationships of various structurally related nodes and/or modules, the destination address, the source address, or both, so as to achieve data link type functionality. Data link type functionality allows us to have high priority data transmission paths across multiple levels of hierarchy without requiring the particular address having high priority across all of these levels of hierarchy. The priority codes are used to provide a guaranteed response time through certain paths of the network, regardless of whether those paths are secured or not.

The communication network can therefore be thought of as including a first forwarding module coupled to receive a first packet of data and assign a first priority code to the first packet of data depending on an address from which the first packet of data was sent. The network may therefore include a second forwarding module coupled to receive a second packet of data and assign a second priority code to the second packet of data depending on an address from which the second packet of data was sent. An arbiter is coupled to forward the first packet of data across a portion of the communication network instead of a second packet of data if the first priority code is higher in priority than the second priority code. The arbiter is therefore said to grant accesses to downstream paths depending on the priority code of the incoming packets. Thus, the arbiter decides how to utilize a shared resource (e.g., the downstream path) when two or more packets arrive upon a network node or module. There are various ways in which the arbiter forwards multiple packets from one source before forwarding multiple packets of another source. Fixed arbitration may be one method, round-robin arbitration may be another.

The first forwarding module may be coupled within a first hierarchical portion of the communication network and have a first storage device containing a first grouping of bits unique to that first level. The second forwarding module may be coupled within a second hierarchical portion and have a second storage device containing a second grouping of bits unique to the second level. A third forwarding module may be coupled within a third hierarchical portion and include a third storage device containing a third grouping of bits unique to the third level, as well as an arbiter coupled to forward a packet of data from either the first forwarding or the second forwarding module depending on a comparison of the first, second, and third groupings of bits.

The arbiter may therefore be used to forward the packet of data from the first forwarding module if the first grouping of bits yields a first level of priority greater than the second level of priority. Alternatively, the arbiter can forward the packet of data from the first forwarding module if the first grouping of bits yields a first level of priority the same as the third level of priority. Still further, the arbiter may forward the packet of data from the first forwarding module if the first grouping of bits yields a first level of priority different from the third level of priority. Regardless of the arbitration algorithm used, the arbiter decides which packet of data is to be forwarded to a shared resource. The first, second, and third groupings of bits are read from the first, second, and third storage devices and appended to data forwarded from the first, second, and third forwarding modules, respectively. Importantly, the first, second, and third groupings of bits are set by instructions sent over a bus separate from the data flow path of the communication network. In this manner, a hacker cannot sniff or spoof data packets by accessing security registers and/or mapping tables configured within the forwarding modules. Absent access to sensitive mapping information contained therein, a hacker cannot tap into, write, or read packets of data sent across the structured, secured network.

BRIEF DESCRIPTION OF THE DRAWINGS

Other objects and advantages of the invention will become apparent upon reading the following detailed description and upon reference to the accompanying drawings in which.

Figure 1:
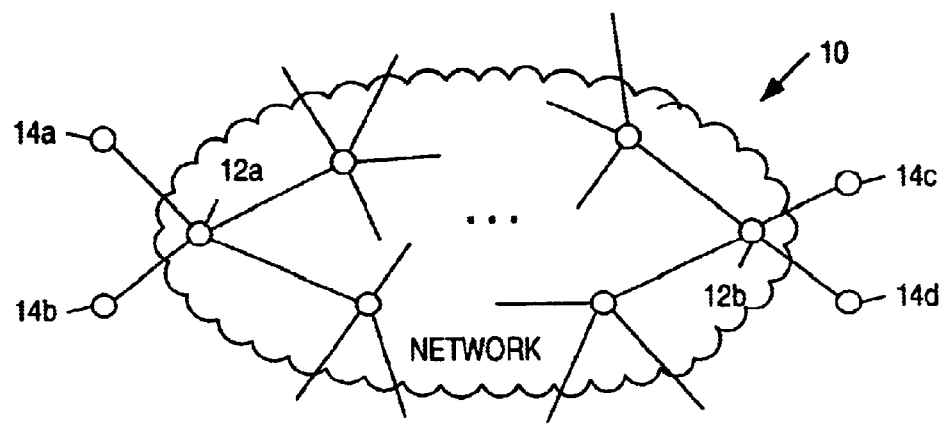
FIG. 1 is a diagram of a set of hierarchically arranged nodes within a structured network configured between nodes of a non-structured network, or between termination devices.

While the invention may be modified and have alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

Turning now to the drawings, FIG. 1 illustrates a communication network 10. Network 10 includes an interconnection of subnets linked by nodes 12. Network 10 can be thought of as one or more intranets interconnected with one another, or interconnected via an internet.

Each node 12 may embody a subnet or a plurality of interconnected subnets. Select nodes 12a and 12b can be used to receive input data into the structured network or transmit output data from the structured network. Nodes 12a and 12b can be connected to external nodes of a conventional network or termination devices 14.

Figure 2:
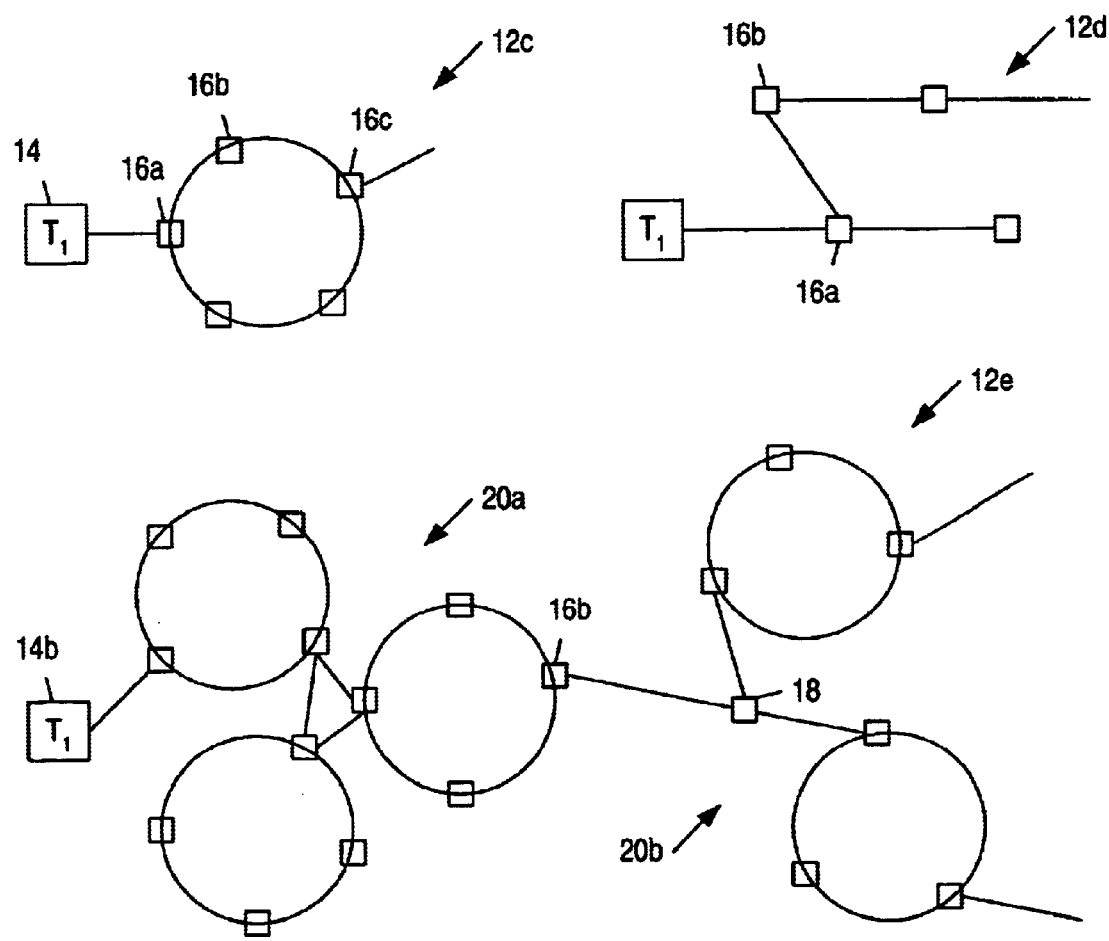
FIG. 2 are diagrams of a node configured according to a single loop, multi-loop, multiple interconnected multi-loops or point-to-point topography, each configuration having a set of modules interconnected with one another between loops or along a loop or backbone.

FIG. 2 illustrates exemplary forms of node 12 and, more specifically, modules 16. In the example shown, an entry module 16a receives packets of data from a termination device 14. Node 12c illustrates a node comprising modules interconnected about a ring topography, referred to as a "loop". Along with the entry module 16a are intermediate modules 16b and 16c.

It is recognized that a node or subnet can include either a backbone or ring topography, depending on the desired application. The various nodes 12 can be classified as single nodes or multi-nodes, each of which can be an end node, a pass-through, or an intermediate node depending on where within the network they are arranged. The various modules within each node can also be classified as an end module, a pass-through, or an intermediate module based on their position within the network. Further illustrated by node 12d is the inter-relationship between an end module 16a and an intermediate module 16b. An end module 1 6a is classified as either an entry module or an exit module, depending on whether it receives packets coming into the structured network or transmits packets from the structured network. An intermediate module simply passes the packets from one module to another module, or from one node to another node. Each module is configured in hardware to be somewhat similar to other modules, dependent only on the number of input and output ports needed by that particular module. Variability is imparted in the way in which the modules are programmed. An entry module is programmed to wrap the incoming packets, an intermediate module may modify and/or forward the wrapped packets, and an end module strips the wrap information. Specificity of each module is imparted during configuration dependent on each module's position within the overall network. It is understood that the modules access physical media and configuration occurs within registers or each module. A decoder which operates similar to a Media Access Controller ("MAC") discerns the incoming packets based on the destination MAC address using various types of physical media protocol, such as Ethernet, Token Ring, FDDI, or ATM.

Node 12e illustrates two multi-loop combinations of modules, the multi-loops are indicated as reference numerals 20a and 20b. Each multi-loop 20 is shown interconnected by an intermediate module 16b. It may be that one or more intermediate modules of the node are configured off the loop, as shown by reference numeral 18. Modules 16 can have almost any number of input and output ports, and can be configured to either wrap an incoming packet, strip an outgoing packet, and/or pass-through the original packet or modified packet (with or without buffering), depending on where the module is in relation to the network topography or termination devices 14.

Figure 3:
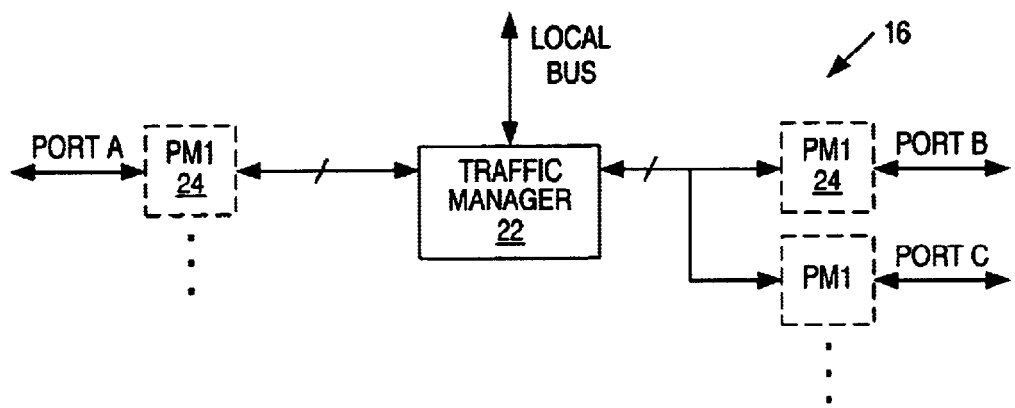
FIG. 3 is a block diagram of a module employed as either an intermediate, pass-through or end module, each of which includes a traffic manager.

Incoming packets can be received over any type of media, including wired media or wireless media. FIG. 3 illustrates a traffic manager 22 which serves numerous functions, one of which is to optimally route packets of data between input and output ports. The number of input and output ports can vary and the interconnection between certain input ports and certain output ports can also vary depending on the configuration of modules 16. Modules 16 can be called upon to interface with a different physical media than the loop protocol by using a Physical Media Interface ("PMI") 24. PMI 24 performs many functions, one of which includes the MAC function of moving data over physical hardware conductors based on the physical address on each network interface card within the computer termination device, and another of which is to synchronize the packets of data being sent or received. If modules 16 is not used to convert between OSI layers, then the wrapped packet (e.g., a physical media packet wrapped with higher domain protocols) may be directly sent through modules 16 to the appropriate port.

Figure 4:
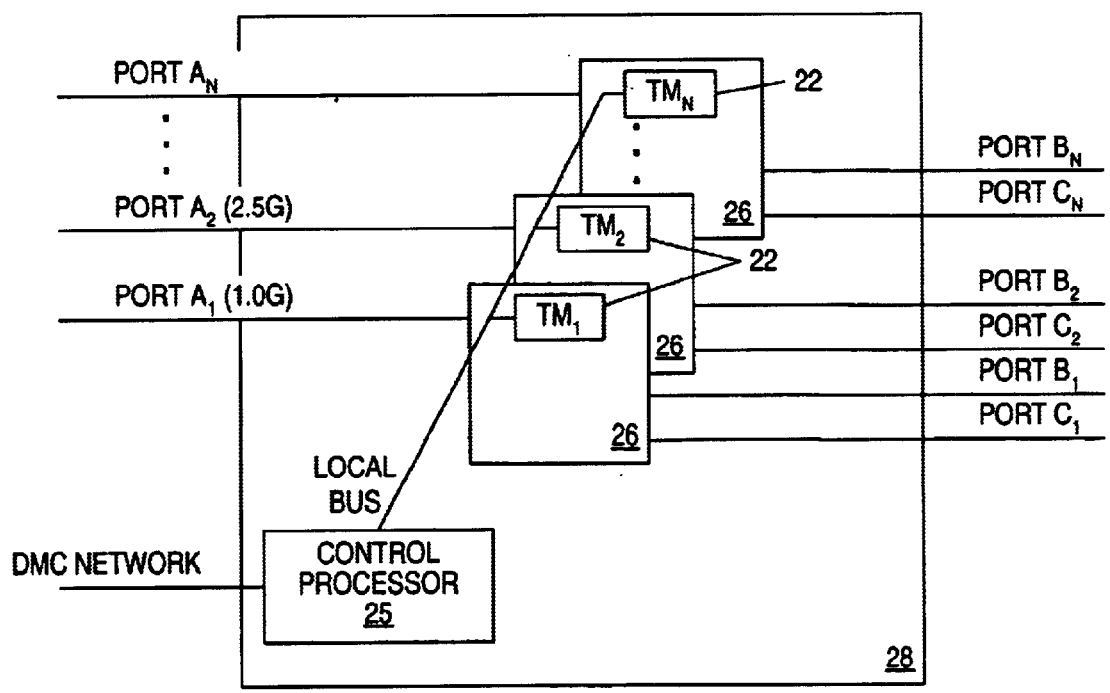
FIG. 4 is a block diagram of the a modular implementation of several traffic managers grouped together in building block fashion according to a particular application and linked by a local bus extending from a control processor.

FIG. 4 illustrates the modularity by which multiple traffic managers can be interconnected to a control processor 25 via a local bus. The functions of control processor 25 and its associated local bus are completely separate from and outside the data communication path of the forwarded packets. Thus, packets are received by input ports, shown as port A and are disbursed to output ports, shown as port B or C. The incoming packets on port A, can be forwarded at a dissimilar speed and possibly with a dissimilar protocol from that of packets forwarded across port $A_2$. As shown, packets speeds for port $A_1$ may be 1.0 Gb/s, whereas speeds across port $A_2$ may be 2.5 Gb/s. The incoming packets on port $A_1$ can be forwarded to port $B_1$ or port $C_1$, while incoming packets on port $A_2$ can be forwarded to port $B_2$ or port $C_2$, etc. Alternatively, packets from ports A, B, or C can be forwarded back to itself. Traffic managers 22 can each be formed on a printed circuit board 26 separate from each other. Thus, each traffic manager 22 may be formed on a single integrated circuit or a set of integrated circuits interconnected upon a respective printed circuit board. Control processor 25 can be located in a chassis containing the printed circuit board on which each traffic manager 22 reside, or in a chassis separate from those printed circuit boards. One or more printed conductors, cables, or wireless medium may extend from control processor 25 to each of the various integrated circuits which form traffic managers 22.

It is desired that each traffic manager be configured during assembly of the network. Each traffic manager can include programmable logic and, more importantly, non-volatile memory. When programmed, the traffic manager 22 will maintain its programmed status unless it is reconfigured. The traffic managers are therefore configurable using known "firmware" program techniques. Such techniques include programmable read-only memory ("PROM"), programmable registers of non-volatile memory, fuses, anti-fuses, etc.

Reconfiguration of the traffic manager can take place if, for example, traffic congestion is discovered in a select region of the network. Alternatively reconfiguration can occur when the network is changed or expanded. Still further, reconfiguration might occur when a section (e.g., subnet) of the network is taken down or deactivated for various reasons. In these instances, one or more traffic managers can be reconfigured in the field or, alternatively, those traffic managers can be selectively reconfigured using a broadcast technique. Reconfiguration signals may be sent from control processor 25 to achieve that end.

Figure 5:
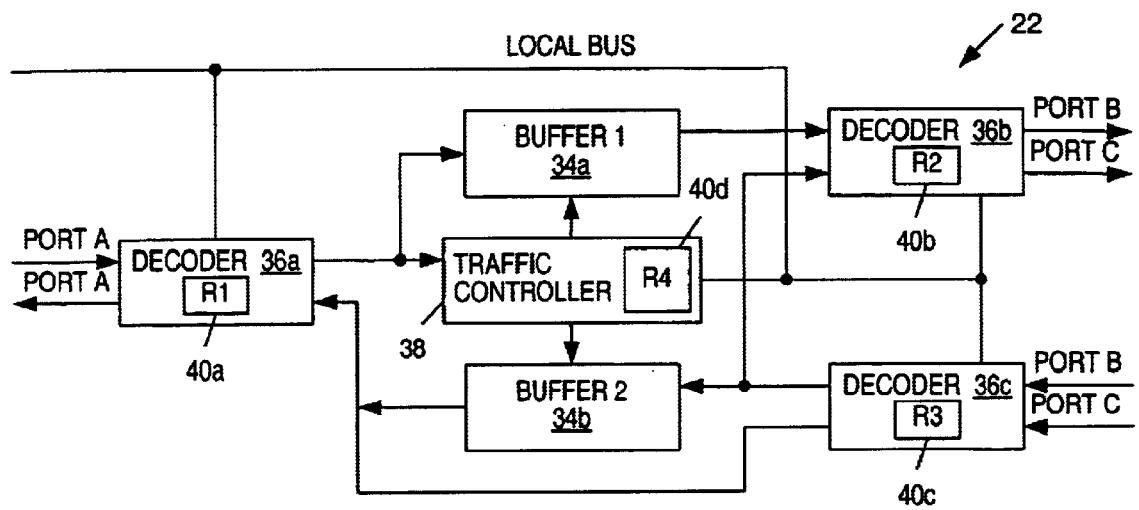
FIG. 5 is a block diagram of a traffic manager comprising a traffic controller linked to buffers and decoders placed within the data transmission path of the network.

FIG. 5 illustrates traffic manager 22 shown in more detail. Traffic manager 22 functions to direct incoming data to an appropriate output port. It determines the output port for an incoming data packet based on a simple algorithm. The traffic manager is aware of its position relative to the network and its neighboring traffic managers or nodes. Based on this knowledge, the traffic manager determines the appropriate output port in accordance with the predetermined algorithm. The traffic manager 22 also interfaces between ports of different media, speed, and direction. After the output port assignment is made, the traffic manager can (i) store the data in a local buffer if the incoming data is slower than the speed of the directed-to output port until there is sufficient time to sustain the speed of the output port, (ii) forward the data without an intervening storage if the output port is free or if the incoming data is at the same speed as the output port, or (iii) transfer the data through a FIFO-type storage device when the incoming data is coming at a faster rate than the speed of the output port. The traffic manager also manages resource allocation, such as allocation of various output ports and buffers, and the algorithms make decisions regarding allocation to reduce the latency through the traffic manager.

Traffic manager 22 includes one or more buffers as well as one or more decoders. In the example shown, the buffer is distributed as two buffers 34a and 34b, and the decoder is distributed as three decoders 36a, 36b, and 36c. Distribution of the buffers and decoders depends in part on the configuration of the ports. In the example shown in FIG. 5, a three-port configuration is shown. However, more than three ports and possibly only two ports can be used, wherein the number and distribution of decoders and buffers would correspondingly change.

Each port is shown as a bi-directional port and thereby accommodates full-duplex dialogs. The physical media of port A may be different from that of port B or port C, especially if traffic manager 22 is configured within an end module or an intermediate module. For example, decoder 36a serves to decode addresses within an incoming packet sent into port A, to ensure traffic manager 22 is to receive the packet. Traffic controller 38 can be used to decide whether the packet should be forwarded to output port B or output port C. In many instances, the packet can be forwarded directly from port A to port B (or port C), or is forwarded through buffer 34a. Similar to port A, packets sent to ports B and C can be forwarded to port A, port B, or port C via decoder 36c. Traffic controller 38 includes control signals and address lines extending to each of the buffers and decoders for effectuating optimal routing based on the availability of the destination ports. Coupled in parallel across buffer 34b may be a series of conductors over which packets can be sent instead of sending those packets through buffer 34b. Thus, incoming packets on port B or port C can be forwarded directly to port A, to port A through buffer 34b, or directly to port B (or port C) as shown in the example of FIG. 5.

Within decoders 36 and traffic controllers 38 are configuration registers. Configuration registers may be configured from an In-System Programming ("ISP") tool used for configuring a Programmable Logic Device ("PLD") or a Programmable Gate Array ("PGA"). The configuration registers and therefore the traffic controllers and buffers can be thought of as a PLD or a PGA. Alternatively, the configuration registers can be programmed from non-volatile memory possibly associated with traffic manager 22, or from the control processor via the local bus. The configuration registers 40 receive configuration information preferably during initiation of power to traffic manager 22. Alternatively, registers 40 may be programmed as an SRAM. Still further, registers 40 may include a PROM or ROM permanently programmed by the network installer. Contained within each register are bits used to enable certain ports in order to fix the forwarding of packets from one port to another. Alternatively, each register may be configured to select various ports and paths based on dynamic traffic conditions.

Within register 40a are bits that can be programmed to enable transfer of all packets from port A to port B, for example. Other bits may be programmed within the various registers to include an identification number attributed to that particular traffic manager of module. Each module within the network has a corresponding unique identification number stored in a corresponding configuration register. The identification number signifies the relative location of the node with respect to other nodes in the structured network hierarchy. The identification numbers of all modules within the network contain bits are bifurcated into fields and, as described herein below, each field corresponds to a particular hierarchical level. A decoder which receives incoming packets can be configured by the corresponding register to only decode a field of bits to which the particular module has been attributed. In other words, if module 22 belongs to level three, then decoder 36a decodes the destination address of the incoming packet sent across port A within field three of the multi-field address. This ensures a fast decode operation and significantly enhances the throughput of data. If the decode yields a comparison, then decoder 36a will forward the packet to the appropriate decoder 36b or 36c depending on which port is configured as the output port established within register 40. Alternatively, a decoder may be configured to decode all fields above it in hierarchical level, or one field above it, to determine if the packet belongs to the current level. Further details regarding differing functions, configurations, and operations of traffic manager 22 will be provided below when discussing whether the traffic manager within a particular module operates as an end module or an intermediate module. The buffers 34 can be distributed as shown in FIG. 5, or can be a centralized buffer, depending on the configuration of the input and output ports. Regardless of its configuration, the buffer operates as a temporary memory space and, preferably, a contiguous memory space, such as that found in semiconductor memory. A popular form of semiconductor memory includes single or multi-port RAM or DRAM (e.g., ZBT RAM or SDRAM).

All modules associated with a particular hierarchical level have a unique bit or set of bits programmed within only one grouping of bits (field). Field N may include X number of bits which can therefore accommodate $2^X$ number of modules within level N of the structured network. Similarly, level N−1 may have Y bits and there may be $2^X$ level N−1 groups and each of these groups in level N−1 can have $2^Y$ number of modules. If field N corresponds with the highest hierarchical level, any routing beginning at that level entails decoding field N address of the incoming data with field N identification number before decoding the next level (i.e., field N−1).

Figure 6:
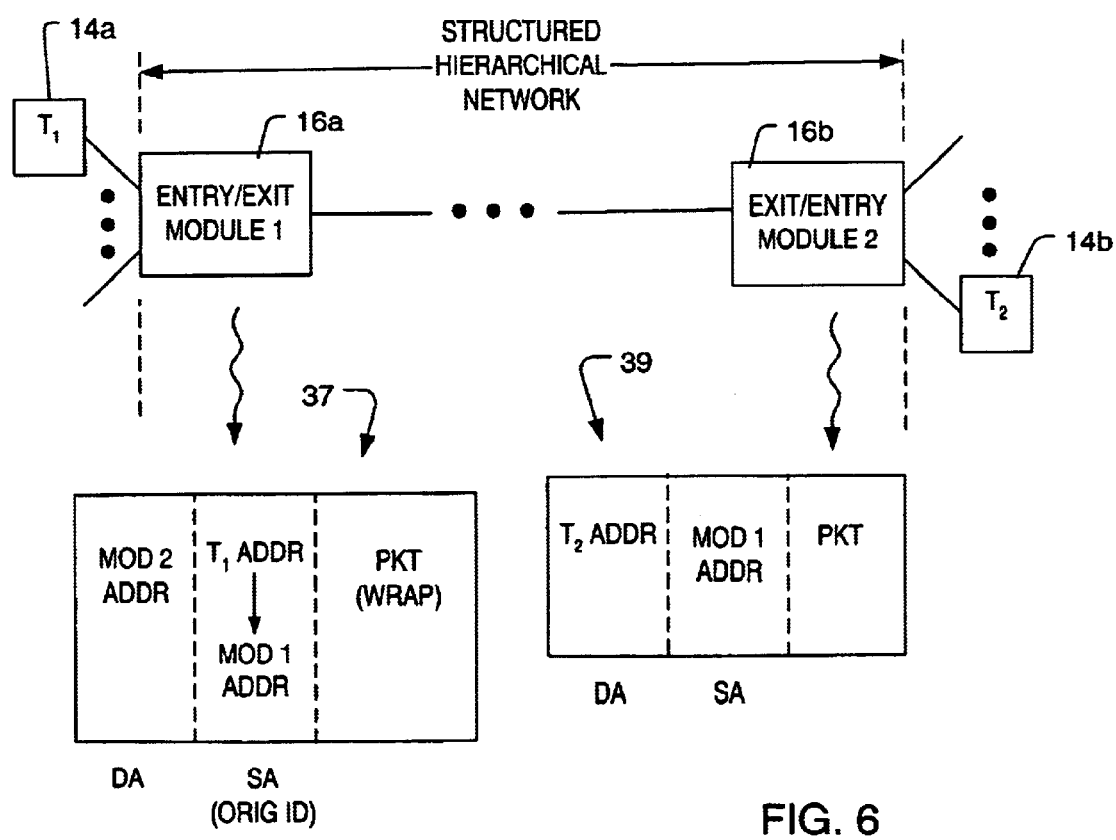
FIG. 6 is a block diagram of end modules placed on opposing ends of the structured, hierarchical network, each end module is shown linked to at least one termination device and having resulting source and destination addresses shown.

FIG. 6 illustrates routing of the packet through the structured, hierarchical network. While structured positioning and fast decoding perform distributed routing within the network, identification of a routing path to and from termination devices must be established. Coupled to termination devices 14a and 14b are end modules 16a and 16b. If device 14a is the originator of a packet, then end module 16a can be considered an "entry" end module, or simply entry module. If the incoming packet includes a destination address to termination device 14b, then device 14b is considered the targeted or destination termination device, and end module 16b is considered an exit module.

An address resolution mechanism is used to identifying the relationship between termination devices and end modules (particularly when there are multiple termination devices per end module), and how the incoming packet is routed from the originating termination device to the destination termination device 14a and 14b, respectively. An Address Resolution Protocol ("ARP") is broadcast from termination device 14a. The destination address of a broadcast ARP is to each and every node within the network, and continues on until all nodes have received the resolution protocol. Contained within the resolution protocol may be an address of destination termination device 14b. If so, device 14b replies back across the network and eventually to the originating termination device 14a. Based on the broadcast of addresses and ensuing replies, the positions of termination devices relative to end modules can be determined based on the address of those destination and origination devices. Accordingly, the address at destination device 14b is found based on its address being broadcast. That address and its configured location relative to end module 16b will thereby resolve their connectivity relationship. It is from the resolved location that a packet can be quickly transferred between locations external to the present structured network (i.e., termination devices or a non-structured, conventional network).

Transfer of a wrapped packet from an originating termination device 14a to a destination termination device 14b entails numerous mechanisms. Reference numeral 37 illustrates a wrapped packet ensuing from entry module 16a. The wrapped packet includes a source address (SA) of an originating termination device having a unique identification number, and also includes a destination address (DA) of the exit module (MOD2 ADDR) 16b. The source address is therefore the address of termination device 14a which gets translated within the entry module 16a to an address of module 16a. This translation proves beneficial when the destination termination device replies to the originating termination device.

Upon receipt of the wrapped packet by exit module 16b, the destination address changes from exit module 16b to destination termination device 14b, indicative of possibly numerous termination devices attached to module 16b. The source address, however, remains the same as that which was changed when the packet is forwarded into the structured network. Given that the destination address is termination device 14b, exit module 16b performs the entirety of all mapping needed by the structured network. Mapping occurs in order to determine which of the possible N number of termination devices 14b is to receive the outgoing packet.

Mapping proceeds by comparing the address within the packet against the appropriate identification number of a possible N number of termination devices. A mapping table or a generalized selection unit may therefore be formed within memory of exit module 16b. Mapping is performed by comparing the destination address within the wrapped packet against the identification number of a termination device selectibly coupled to the exit module 16b. When the comparison yields a match, the packet is forwarded to the appropriate termination device.

Any reply of the initial forwarded address can be sent back across the structured network based on the format of the wrapped packet. More specifically, the source, address of the reply remains the address of termination device 14b; however, the destination address is the previous source address. In this manner, reply information is made similar to the initial forwarded information. Regardless of the initial request or a subsequent response, the packets of data are routed to the opposing end module. In particular, information from termination device 14a is directed to exit module 16b, while reply information from termination device 14b is directed to entry module 16a. A source address is therefore said to change whenever a packet enters the network; however, the destination address remains the same. The same procedure applies on a reply.

Figure 7:
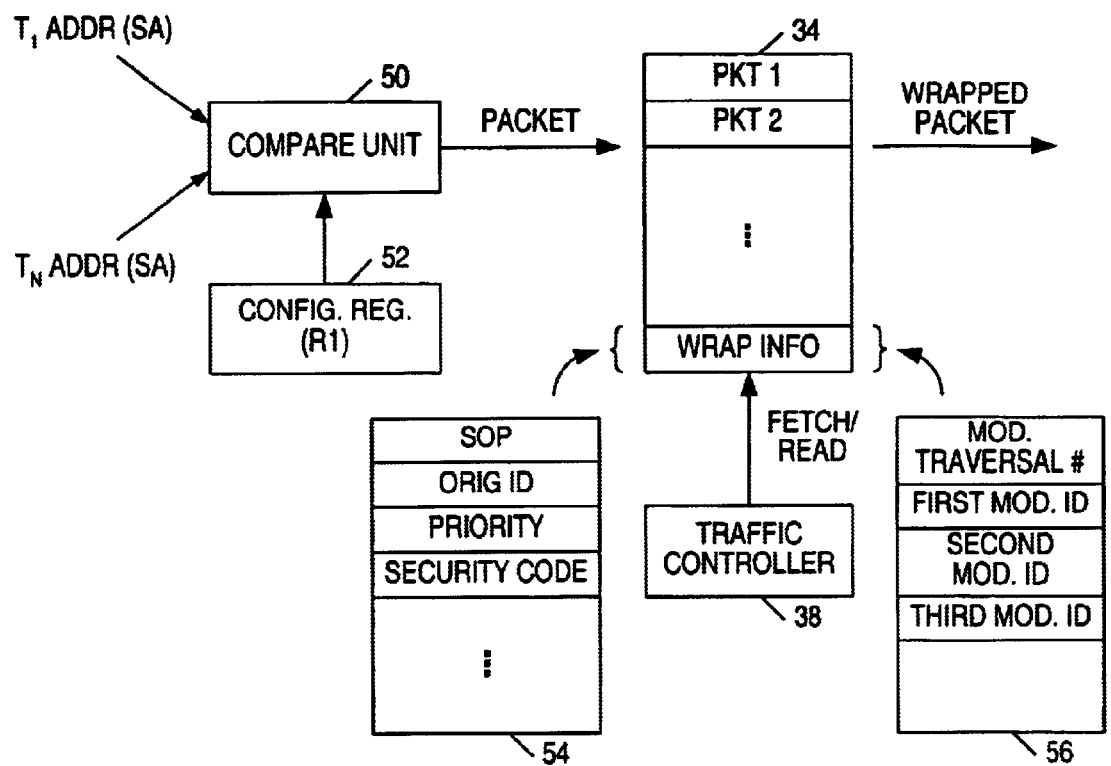
FIG. 7 is a block diagram of a comparison function occurring at the entry module and, resulting from that comparison, placement of security information (identification and authorization codes) and priority code at the header of the packet as well as security breach information (auditing codes) at the trailer of the packet.

FIG. 7 illustrates various components of an entry or intermediate module and, more particularly, to a compare unit 50 coupled between an input port decoder (shown in FIG. 5) and a storage device 52. The storage device may be one or more configuration registers, or a table. Each node may have logically separate storage devices or address ranges within device 52 dedicated for different functions such as an entry storage device portion, an intermediate storage device portion, and an exit storage device portion depending on whether the node is attributed to an entry, intermediate or exit function, for example. As shown in FIG. 5, the decoder receives an incoming packet and determines whether the incoming packet is destined for the network based on an identification number forwarded with that packet. FIG. 7 indicates compare unit 50 which compares the identification number on the received packet with a set of bits within the entry storage device 52 to determine if the data will be transferred as secured data to the communication network. The configuration register is set by the administrator during configuration using, for example, ISP techniques. Entry configuration register 52 can be thought of as part of the entry module decoder configured at the input port of that decoder or, alternatively, can be separate from the register of the incoming packet decoder. Once compare unit 50 determines whether the incoming packet is a secured packet, it will place that packet in a particular position within buffer 34.

Buffer 34 is thought of as a contiguous memory location which may be bifurcated into regions, some of which receive packets placed within those regions. That is, the first packet (PK1) is forwarded into and placed within a selected portion of buffer 34 before the second packet (PK2) is placed and stored. Buffer 34 therefore serves as a FIFO buffer, for example. The incoming packets are wrapped as they leave buffer 34 by attributing wrap information to a particular packet before forwarding the wrapped packet from the buffer. Wrap information is stored can be another region of buffer 34 and can include, but is not limited to, the information shown in tables 54 and 56. That information may comprise a grouping of bits indicating a start-of packet (SOP). Another group of bits may be used to indicate the originating identification number of the entry module (ORIG ID). Another set of bits may be dedicated to assigning a given priority at which the attributed packet is to be sent across the network, while yet another set of bits may be used to assign a security code to those packets. The priority code and the security code may be determined based on the identification of the user generating the packet.

Table 54 can be drawn from buffer 34 and, by virtue of a read pointer, bit fields are applied to a header of the wrapped packet. Table 56 illustrates bit fields which are drawn and placed as a trailer upon the wrapped packet. A first grouping of bits within the trailer may be used in conjunction with a counter to increment each time the packet traverses a module. The first grouping, or MOD TRAVERSAL #, represents the number of modules traversed, including the existing module, by a packet sent through the communication network. The MOD TRAVERSAL # is dependent on the path taken either around a loop or among loops. The MOD TRAVERSAL # can be forced in select loops or paths to limit it variability and number of permutations. Additional fields are reserved for indicating the first module identification number, second module identification number, third module identification number, etc. for all modules being traversed up to and including the existing module. It is therefore important to note that module 16a need not be merely an entry module. Instead, it may be an intermediate module, whereby the wrap information is modified as it traverses the network. In other words, the incoming packet can be wrapped with an original ID, priority code, security code, module traversal #, and earlier (upstream) module identification numbers, and the present module simply updates that information or maintains that information on the header and trailer exiting the present module.

Traffic controller 38 operates basically as a compiler which performs a series of read operations upon buffer 34.

Those read operations occur to fixed regions of that buffer so as to read bits from those regions in a particular sequence so that the resulting, outgoing packet is serially fed from the buffer in a particular order. As such, the compiler part of the traffic controller can be thought of as containing a state machine of sequential logic and a pointer which perform a first read of possibly a null pattern, indicating the end of the prior wrapped data packet. The read null pattern is contained within the wrap information of the buffer, as well as other wrap information described above. The order in which the originating identification number, priority code, and security code within the header is not necessarily important, as long as that information is somehow contained upon the header of the packet as it exits the module and is consistent across the network. The header information, as well as the trailer information, can be appended by an entry module or modified by an intermediate module based on the information stored in buffer 34.

The compare unit 50 of FIG. 7 can either be unique to an entry module or an intermediate module, and serves merely to determine if the packet should be continued from the module as secured data depending on the comparison results. If the bits within the entry storage device 52 of an entry module do not compare with the incoming identification number, then the packet may simply be dropped or tagged as an unsecured packet. If the bits within the intermediate storage device 52 of an intermediate module do not compare with the security code of the incoming packet, it will not be allowed to be accessed by any termination device attached to that module. If the bits within the exit storage device 52 of an exit module do not compare with the security code of the incoming packet, the incoming packet will be rejected and not forwarded to any attached terminating devices.

Figure 8:
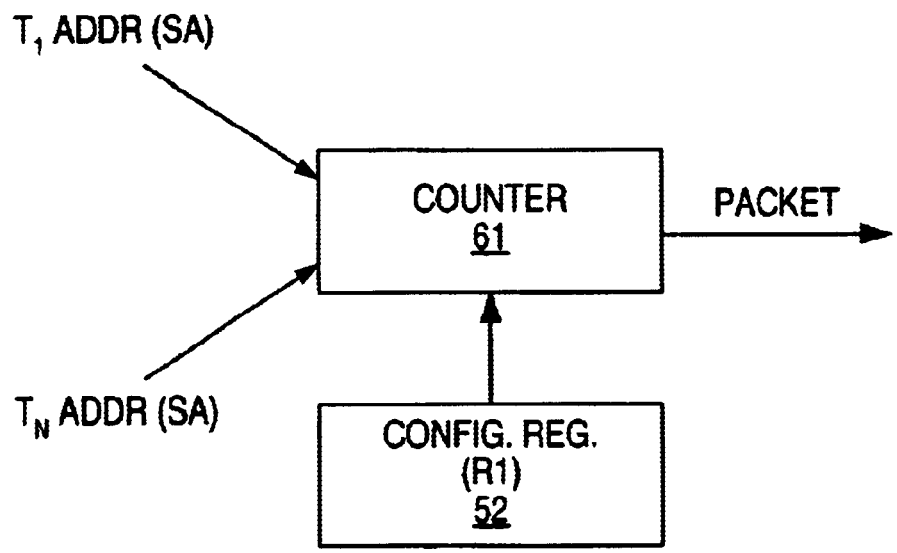
FIG. 8 is a block diagram of counter used to block future accesses to the entry module if the access count exceeds a pre-defined number.

FIG. 8 indicates a counter 60 coupled between the decoder (FIG. 5) and the storage device 52. Counter 60 can be a set of counters and is preferably embodied within an entry module and counts the number of accesses upon the entry module by an entry termination device. This count can be used to control the amount of access generated to and from a secured user. For instance, to control the access from the secured user, further accesses may be blocked when the count number exceeds the count value stored within storage device 52. Use of a stored count value is beneficial if several successive, and possibly unauthorized, attempts to access the network are detected. The counter may undergo periodic reset so that access blocking occurs only if an impermissible number of accesses occur within a specified period of time. Otherwise, the accesses are allowed and packet information is transmitted within the secured network.

The security code shown in FIG. 7 may contain security control bits which are reserved to indicate whether security is on or off. More specifically, the entry module storage device 52 contains bits which may match with an incoming termination device identification number. If so, then the compare unit 50 will forward one or more security control bits to the security code within buffer 34a, and those security control bits will be transferred with the security code from one module to the next until they arrive on the exit module. The exit module can then determine if the data is secured based on a comparison of those bits. In the simplest form, the number of bits simply equals one, to designate a security on or off condition. Alternatively, this control bit can be part of separate control word that will be transmitted with each packet.

Figure 9:
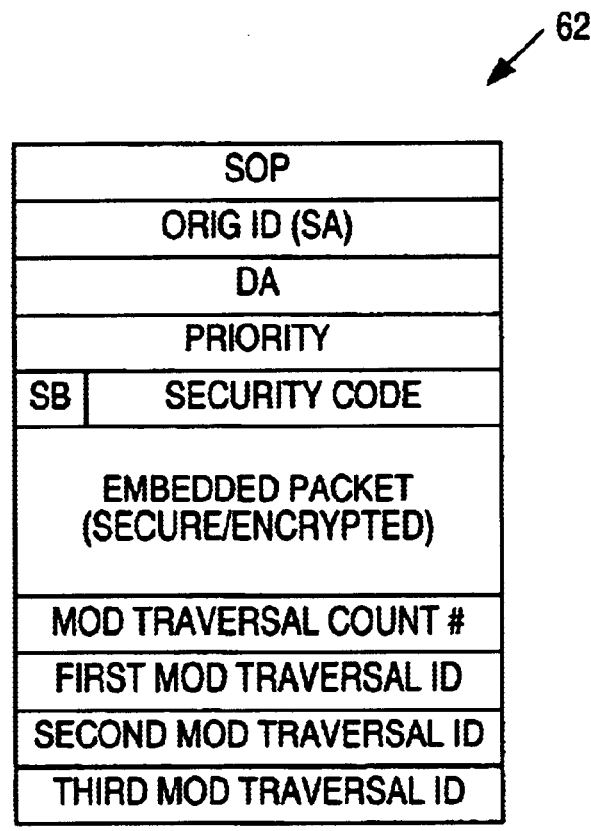
FIG. 9 is a block diagram of a packet wrapped in accordance with a sequence of read cycles shown in FIG. 7, and forwarded across the structured hierarchical network.

FIG. 9 illustrates bits added to and removed from an embedded packet (e.g., a physical layer packet, such as Ethernet). The wrapped packet 62 is but one example of a packet format used by the structured network. There may be additional bits or fields of bits added to the packet, if desired. The entry end module thereby adds the wrap information and intermediate module simply updates the wrap information applicable to the hierarchy of that module. The exit end switch removes the wrap information to yield only the embedded packet with starting and ending identifiers forwarded to a termination device or to other non-structured subnets outside of the present structured network. The embedded packet may or may not include encryption code and can be any of the various packet formats conventionally known in the art. As shown in the security code field, a security bit (SB) may be reserved to indicate whether security for that packet is on or off.

Figure 10:
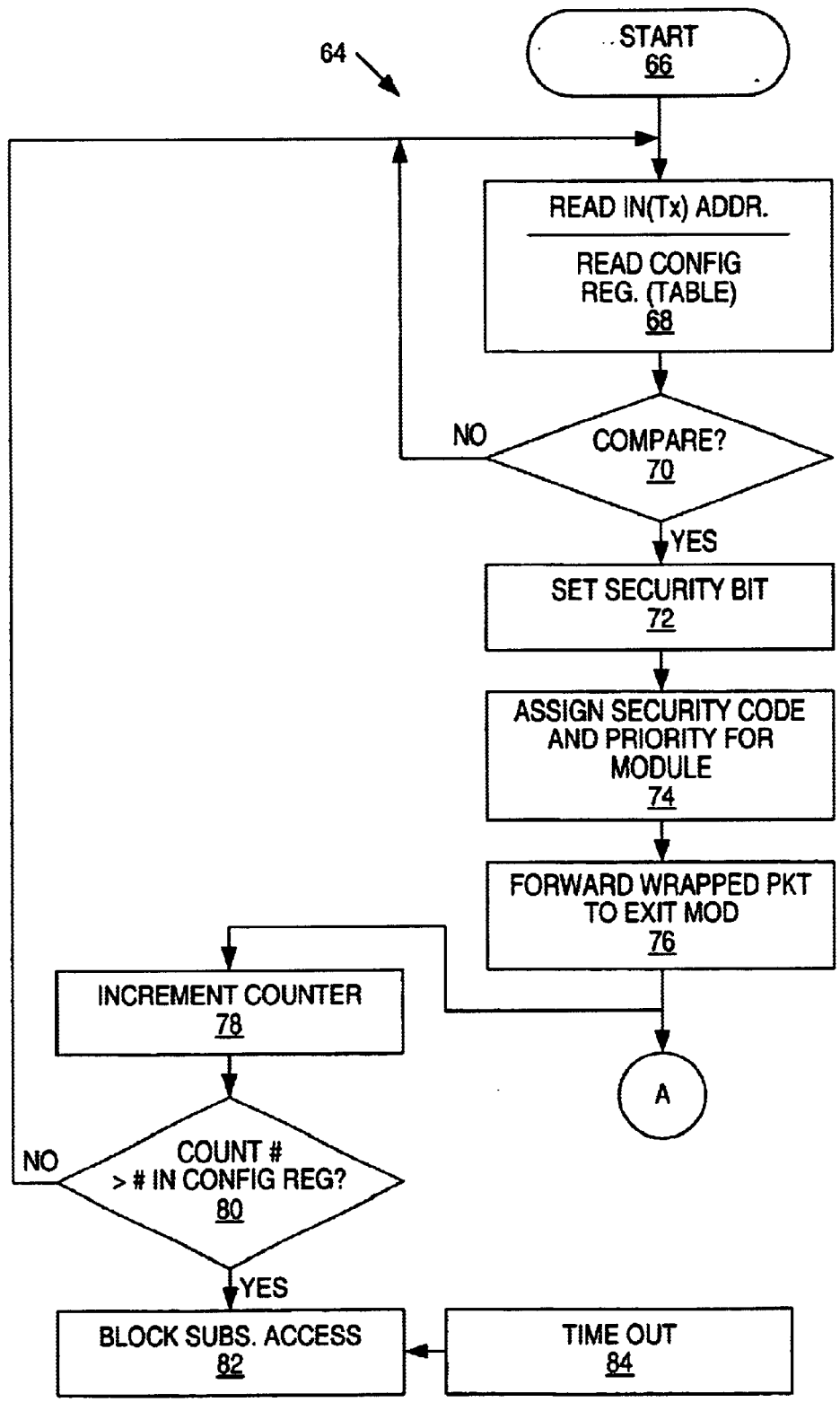
FIG. 10 is a flow diagram of a series of security and priority assignment operations occurring within an entry (or intermediate) module before forwarding the wrapped.packet to the successive module within the network.

FIG. 10 illustrates a flow diagram 64 of operations occurring within an entry module. The operations begin 66 by reading the incoming address and optionally the destination address, whether that address is from (or to) a termination device or from (or to) an upstream module designated with an originating (or destination) identification number 68. The storage device, being either a configuration register or table of the module, is also read as shown by block 68. A comparison 70 is performed on the incoming identification number or address and the bits are read from the storage device. If the comparison yields a match, then the security bit will be set, as shown by block 72. Moreover, the security code and priority code for that particular module will also be assigned 74. Thereafter, the wrapped packet containing the security code and priority code (initially placed or updated) will be forwarded to the next module closest to the exit module, as shown by block 76. If the comparison function 70 does not yield a compare, then the security bit will be reset, no security code will be set, and priority code will be set based on the assigned priority code for that packet at that instance. The packet in this case can be sent as a non-secured packet with default priority, if the module is configured to send non-secure packets or the packet can be dropped. In a given embodiment, priority code and security code can use two independent comparisons. As understood from the foregoing, the destination address of the incoming packet can also be used to determine the secured transmission of packets. In this case, the storage device will also contain a list of allowed destination IDs for secure transmission. Absent (or in addition to) determination arising from the origination or destination addresses, security or priority classes of nodes and/or modules can be used to fix secured or prioritized transmission.

According to an alternative embodiment, each time an access to a module (e.g., entry module) occurs, a counter will be incremented, as shown by block 78. When the count value exceeds a number stored in the storage device or configuration register; as shown by decision block 80, then further accesses are blocked 82. The blocked accesses can arise by executing a time out on the entry module as shown by block 84. If the count value (i.e., between timed resets) does not exceed that which is stored in the storage register, then further accesses can occur.

Figure 11:
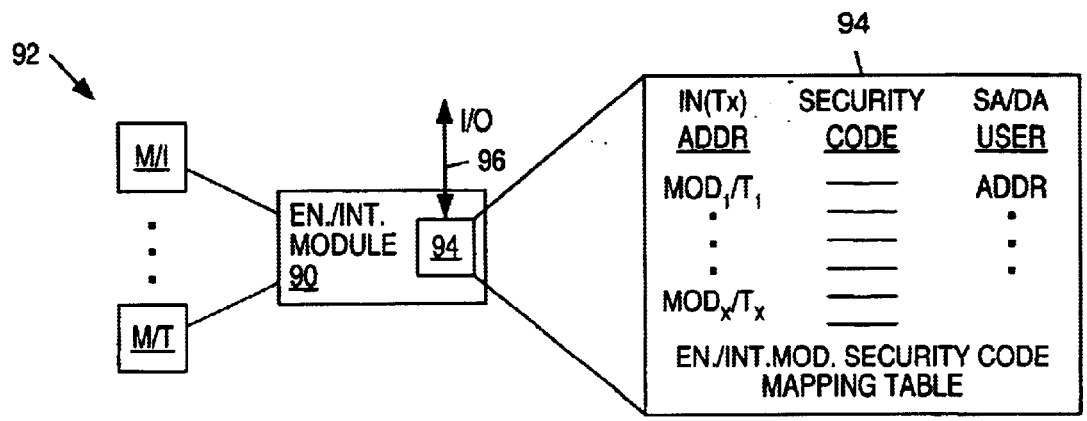
FIG. 11 is a block diagram of a mapping table within an entry (or intermediate) module used to assign a security code to that module based on the source address (identification number) of the incoming packet.

FIG. 11 illustrates an entry or intermediate module 90 which is configured to receive packets of data from an upstream module or termination device 92. Module 90 includes a table 94 operably coupled to the input decode unit. Table 94, similar to a configuration register, can be programmed by signals sent across the local bus 96. Local bus 96 is situated outside of the data flow entering module 90 and, therefore, any information programmed by local bus 96 cannot be read or written to by incoming data packets.

Only the system administrator can effectuate a change to table 94, or can read the status of table 94. Similarly, only the system administrator will be given access to table 94—otherwise it is locked such that modification (read/write) is prevented.

Table 94 comprises a relatively small mapping table of incoming (termination device) addresses and/or users and a corresponding security code. There may be numerous links and, therefore, numerous upstream modules and termination devices connected to module 90, each one having an unique address or identification number known herein as possibly an origination identification number. Various users may also be linked to the upstream termination devices, and security codes can be assigned based also on the users which initiates the source address (SA) and users which receive the destination address (DA). The identification number situated on the incoming packet is read and compared against identification numbers within the table. If a match occurs, then the corresponding new or updated security code will be placed on the packet as part of the header information. If a match does not exist, then a security bit can be set indicating that the packet shall not be a secured packet or, alternatively, the entire packet may be dropped. An unauthorized user would therefore have to know both the security code and the identification code of an entry node/module in order to gain access into the network and would have to know the security code and identification code of in incoming packet in order to gain access to the packet. An additional layer of security might be to employ a user-assigned password, where a user would have to know the security code, identification code and password and match the three indicia before being granted access. Use of the password can prevent circumventing the security codes and identification codes by unwarranted access to the programmed module tables.

Figure 12:
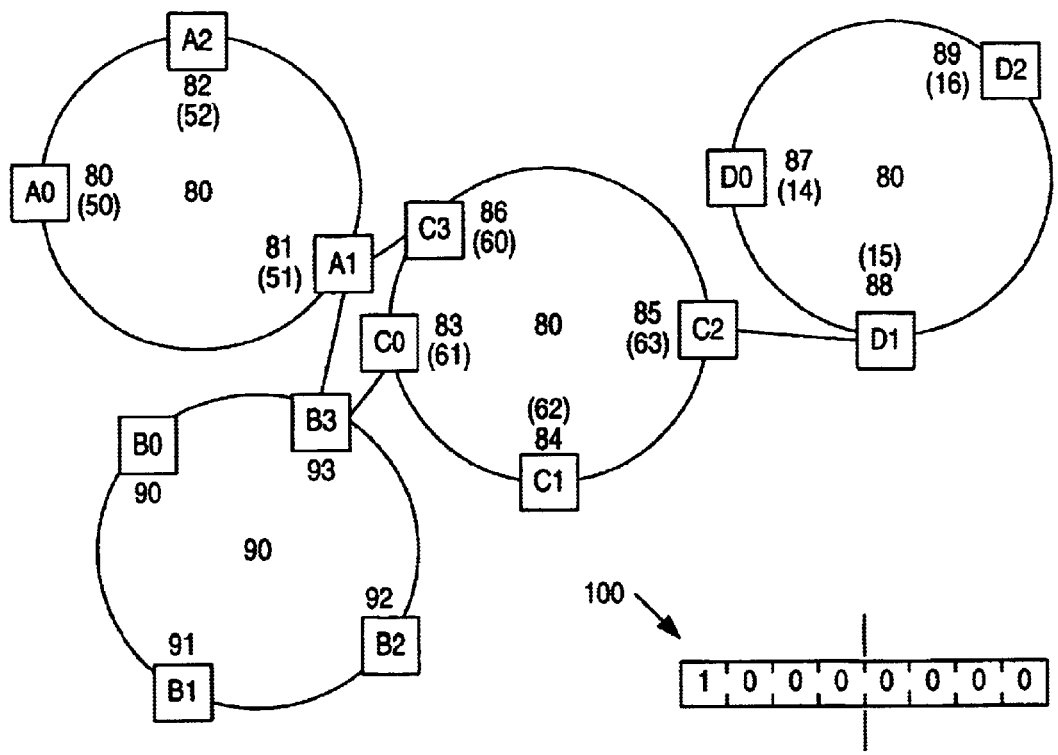
FIG. 12 is a diagram of a node or several nodes arranged in multi-loop, wherein each loop may have a specified security code to effectuate hierarchical transfer of data from loop-to-loop based on the inter-loop security codes.

FIG. 12 illustrates the hierarchy of security codes and identification numbers. According to one embodiment, the number of modules A, B, C, and D can be relatively small, whereby a unique security code, e.g., 80–93, is assigned to the corresponding modules according to a predefined hierarchy. In the example shown, three loops or rings have a security code between 80 and 8F, and one loop has a security code between 90 and 9F. If the number of modules on one or more loops cannot be represented by a given hierarchical class of security codes, then separate identification numbers must be attributed to each module. The identification numbers are shown in parenthesis beneath the security code. In one embodiment, within each loop, the security code or identification number monotonically increases around that loop. It is possible that each module within a class may have the same security code and the identification number is all that changes within that class. In this example, two or more modules may have the same security code number, but with different identification numbersWhen the network becomes fairly large and complex, it is simpler to merely assign a unique identification number for each module and a security code to modules within a given security class. In this manner, a security code can remain constant with the packet as it traverses the, network from module-to-module, and possibly only the initial identification number of the entry module is assigned to the packet and compared with the security code at the exit module to determine security authorization. Alternatively, in rather simple networks, the identification number can be eliminated and both the identification function and the security function can be incorporated into a unique security code for each module; the most significant bits of the security code are reserved for a class or level of security and the least significant bits are reserved for identifying each module within that class, as shown by the exemplary security code format of reference number 100. In the example shown by reference 100, a security code of a 80 may be assigned to a particular module, with security code 81 assigned to the next successive module within, for example, a loop. The security code 82 can be possibly the next module within the loop, and so forth for all modules within the security class of 80 to 8F, in the example shown.

Figure 13:
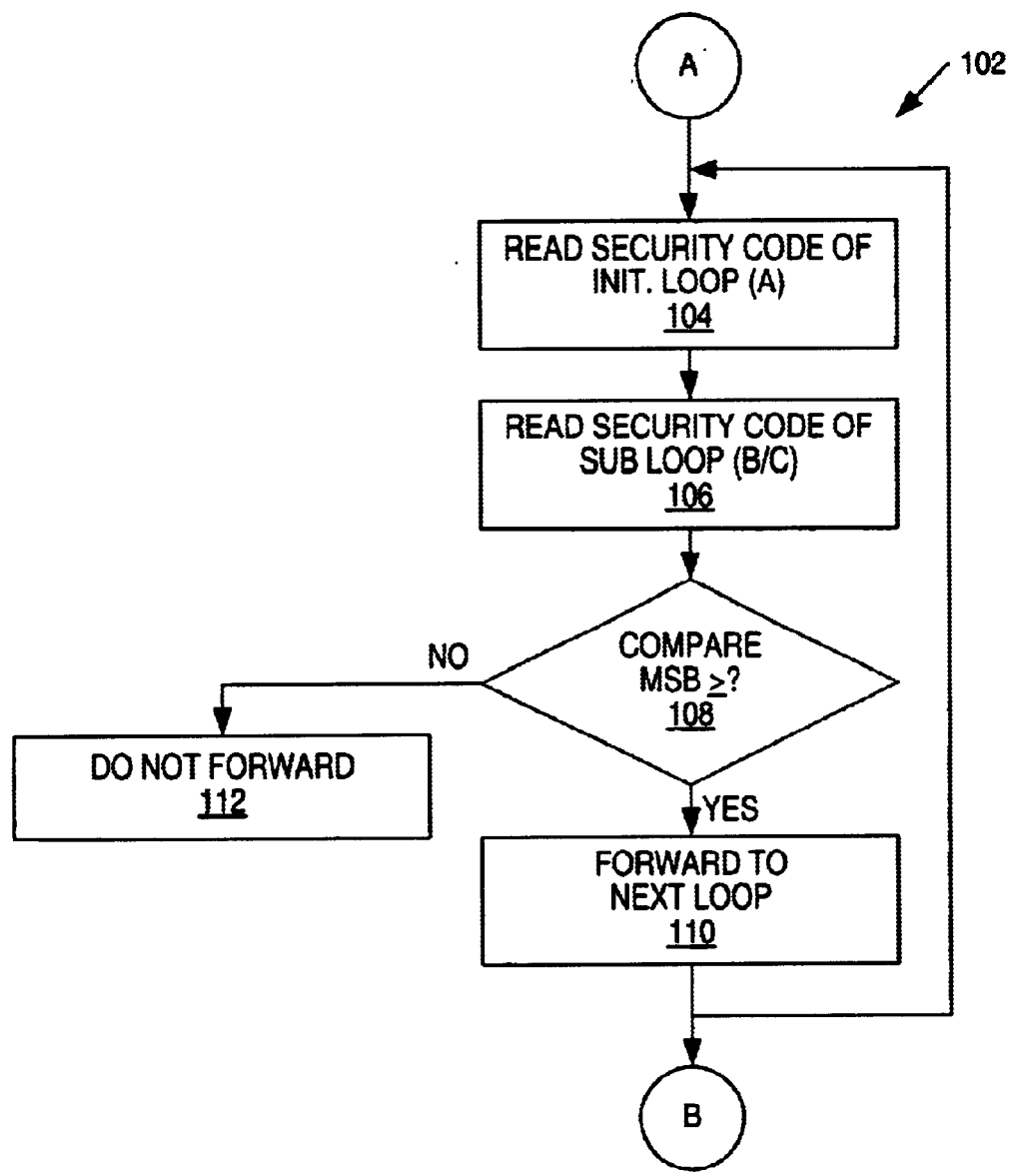
FIG. 13 is a flow diagram of a compare operation used to determine whether to forward data to a successive loop within, for example, the multi-loop structure shown in FIG. 12.

Turning to FIG. 13, a flow diagram 102 is shown of operations which define a secured path based on the hierarchical status of security codes within one or more modules of the present network. In particular, determination must be made on whether to forward a packet of data across a network based on the security code read by the incoming packets.

Description of the steps shown in FIG. 13 is best illustrated in reference to FIG. 12. For example, determination by module C3 on whether to forward an incoming packet of data from module A1 is dependent on the security code of the incoming packet and the security code read from the buffer of module C3. In the flow diagram 102, the security code of the initial loop A, at module A1, is read 104. Next, the security code programmed into the buffer by the user via the local bus of module C3 is read, as shown by step 106. The same can be said of module B3 reading the security code stored within its buffer via a configuration cycle. Modules C3 and B3 perform a comparison function by, for example, comparing the most significant bits of the incoming security code dispatched from module A1 and the most significant bits of the assigned security code of modules C3 and B3, as shown by the compare operation 108. The compare operation can be arranged so that if the incoming security code's most significant digit is greater than or equal to the most significant bit of the downstream, assigned security code, then the incoming packet of data will be forwarded to any module having that assignment. In the example of FIGS. 12 and 13, the incoming security code is either 80 (if identification numbers are used) or 81 (if identification numbers are not used). The assigned security code of module C3 is 86 and the assigned security code of module B3 is 93. Since the most significant digit "8" of security code 81 is not greater than the most significant digit "9" of security code 93, but is equal to the most significant digit "8" of security code 86, then it is determined that the secured path will extend from module A1 to module C3, and not from module A1 to module B3. As noted by the result of compare operation 108, the packet will be forwarded to the next loop C, as shown by step 110, and not forwarded to the next loop B, as shown by step 112. The process is repeated from loop to loop, and therefore from node to node until a secured path is presented through the entire structured network.

Figure 14:
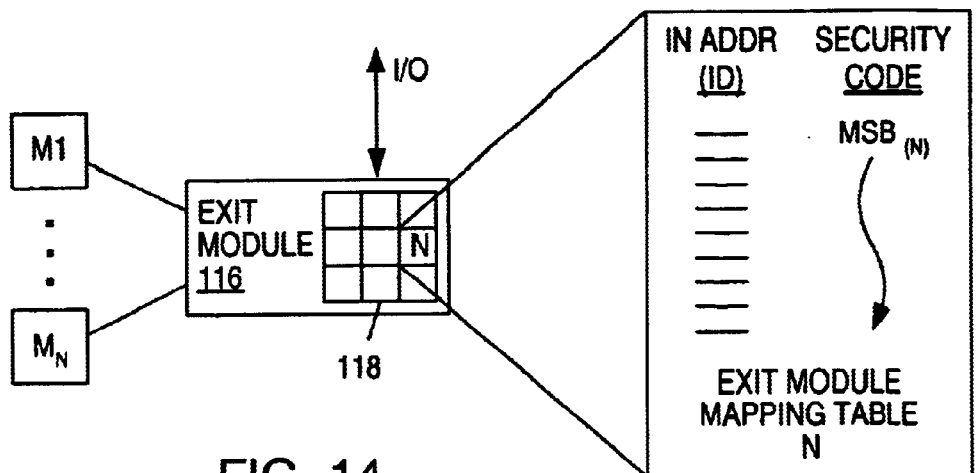
FIG. 14 is a block diagram of possibly multiple mapping tables within an exit module, wherein a comparison of the originating identification number within the entry module can be compared against entries within the selected mapping table to determine if a user is authorized to receive the packet corresponding with the security code and the originating identification number.

Similar to the mapping table of an entry or intermediate module, FIG. 14 illustrates a plurality of mapping tables 118 within an exit module 116. A plurality of mapping tables are needed if the packet contains both an identification number and a security code. As stated above, if a security code suffices both as an identifier and a security classifier, then a identification number is not needed. However, in instances where both indicia is provided within the header, then the most significant bits of the security code defines a particular table within the plurality of tables 118. If the most significant bit represents a number N, then the mapping table N is chosen from the plurality of mapping tables 118. Contained within mapping table N is a set of identification numbers. Those identification numbers are stored within the exit module during configuration via, for example, the local bus or during in-system programming. If the incoming packet identification number (e.g., originating identification number of the entry module) matches the identification number stored in mapping table N, then it will be noted that the entry module has sent a secured packet. The same can be said of an intermediate module bearing an identification number which matches an identification number within a secured packet. In either instance, each of the plurality of mapping tables bears identification numbers which are configured during construction or reconfiguration of the network by commands or instructions inputed upon each module by the system administrator. Users of packets sent into, across and from the network cannot access the storage devices, configuration registers, or tables within the entry, intermediate, or exit modules.

Figure 15:
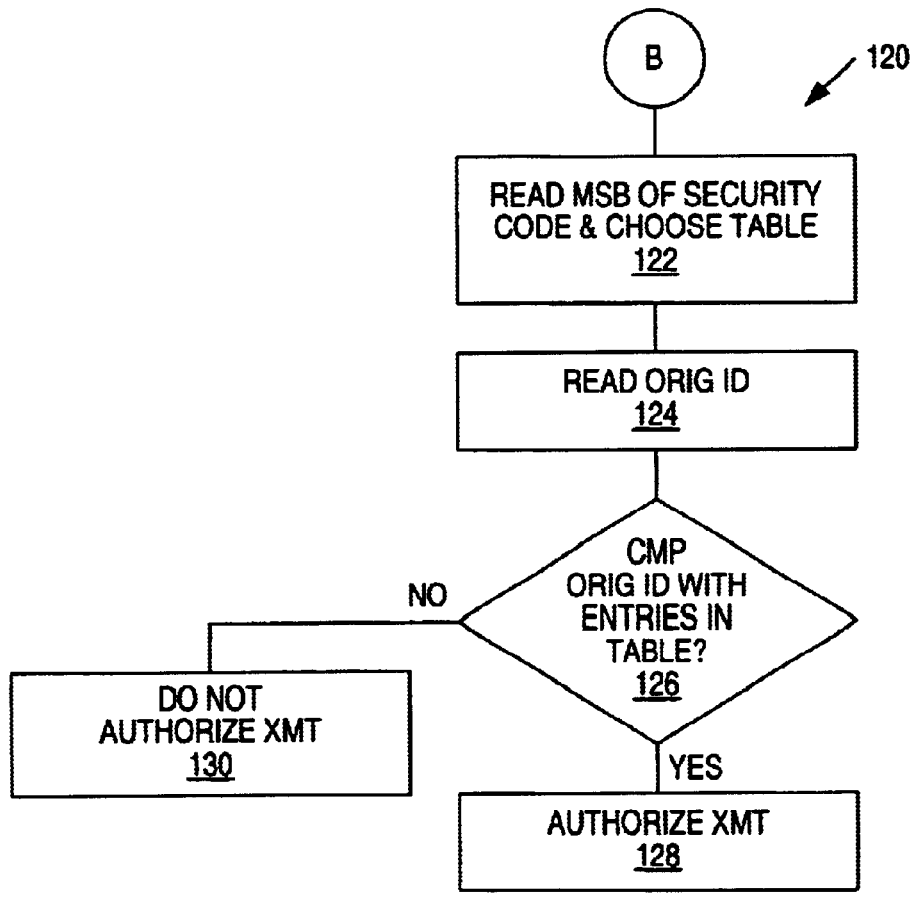
FIG. 15 is a flow diagram of the comparison routine of FIG. 14 for authorizing or not authorizing transmission of the packet to the user at a termination device connected to the exit module.

FIG. 15 is a flow diagram 120 that illustrates a series of operations performed by the exit module of FIG. 14. In particular, the decode unit of the exit module reads the security code and chooses one of the plurality of tables based on, e.g., the most significant bits of the security code. For example, if the security code bears a number 84, then table "8" will be chosen. Reading of the most significant bits and choosing the mapping table is shown by reference number 122. The incoming packet includes an identification number, preferably the originating identification number of the entry module, and step 124 illustrates the exit module reading that identification number from the corresponding packet. A comparison of the originating identification number with entries in the table is made at comparison block 126. If the comparison yields a match, then the packet is authorized to be transmitted from the network to a termination device, as shown by block 128. Otherwise, the packet is not transmitted, as shown by block 130.

Figure 16:
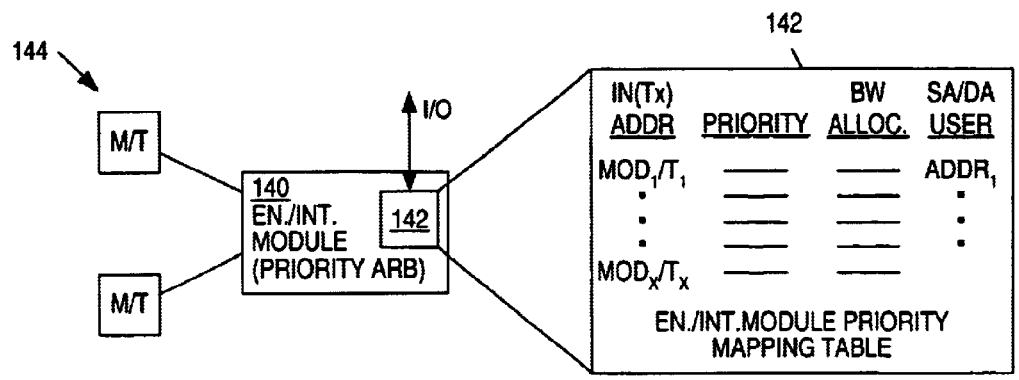
FIG. 16 is a block diagram of a mapping table within an entry (or intermediate) module used to assign a priority code to that module based on a bandwidth allocation value and a comparison to the source address (identification number) of the incoming packet.

FIG. 16 illustrates an entry or intermediate module 140 that includes a mapping table 142. Mapping table 142 is used to assign priority to an incoming packet forwarded from an upstream module or termination device 144. The priority code is allocated based on the incoming address of module/termination device 144 and the bandwidth allocated to a section of the data flow path reserved for that particular packet. Alternatively, the priority code can be allocated based on the source address (SA) and/or destination address (DA) of a module or termination device. In the example shown, priority can be assigned to a subset of the network nodes based on the source address, destination address, structural classification, etc., based on the bandwidth allocated to the transmission branch. Each termination device can, for example, handle differing priority input based on the user connected to the termination device. Priority can therefore be dependent on the user accessing a termination device, as well. Priority can be assigned to any packet arising from a specific source address or, alternatively, from any packet arising from a particular user. Indeed, a packet is assigned priority based on numerous criteria, all of which fall within the spirit of the packet-by-packet assignment herein. For example, the packet can be derived from one of N modules that is allocated a bandwidth (BW ALLOC.) of 1.0 MB/sec.

Figure 17:
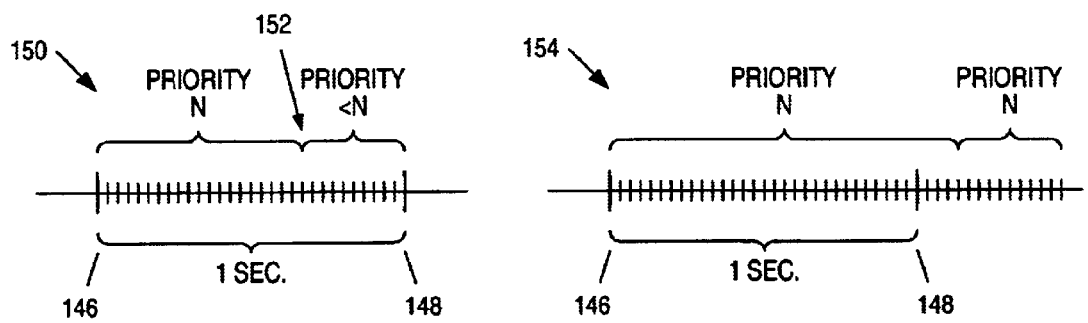
FIG. 17 are two examples of timing diagram used to illustrate dynamic assignment of priority to a header of a packet depending on whether the packet transmission speed exceeds or is less than the bandwidth allocation value.

Shown in FIG. 17 is the interrelationship between the allocated bandwidth and the priority code. More specifically, the forwarding module (entry or intermediate module) shown in FIG. 16 forwards a sequence of packets between a pair of counter resets 146 and 148. As the timing diagram 150 illustrates, a plurality of packets can be sent between resets at a fairly high transmission rate. When the count value of bits or packets achieves, for example, 1.0 Mbits at time 152, all packets prior to that time and subsequent to reset 146 are transmitted at the priority code established within mapping table 142. However, all packets sent after time 152 are sent at a lower, default priority. Timing diagram 154 illustrates the opposite effect, whereby packets are sent at a relatively slow rate. In particular, the packets are sent at a rate slower than the allocated bandwidth, such that, for example, less than 1.0 Mbits are sent between resets and the remaining 1.0 Mbits sent after reset 148 are still sent at the assigned priority of mapping table 142. The allocated bandwidth is therefore the maximum bandwidth that is allocated to the shared resource for the series of packets sent through that resource. If the packets arrive at the shared resource faster than the allocated bandwidth, as shown by reference 150, then the remaining packets prior to the next reset will be forwarded at a lower priority. The lower priority is signified as a lower priority code set forth in each packet sent after 1.0 Mbits have been sent and before the next reset 148.

Figure 18:
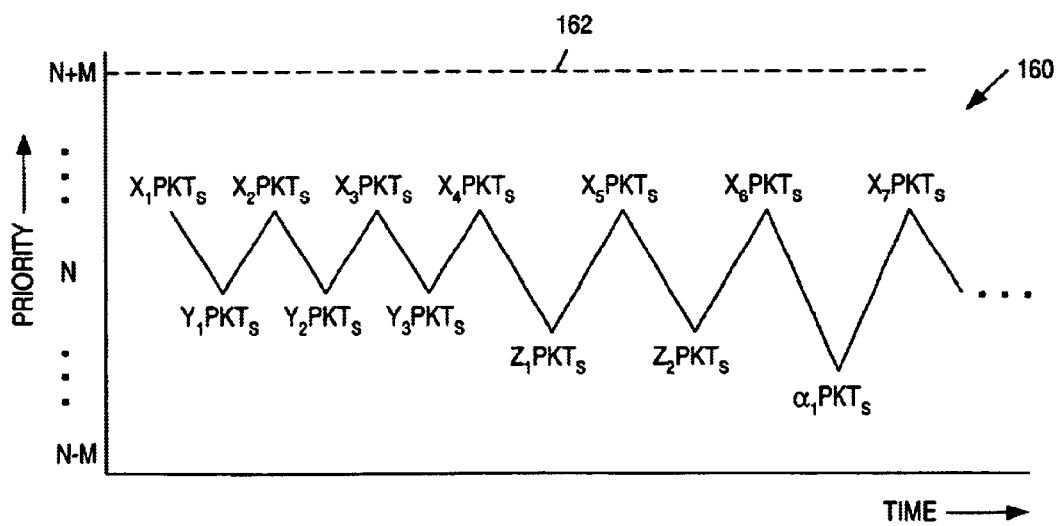
FIG. 18 is a timing diagram of an arbitration scheme for granting bandwidth resources among incoming packets having dissimilar priority codes.

FIG. 18 illustrates exemplary arbitration schemes for granting bandwidth resources among incoming packets having dissimilar priority codes. In particular, timing diagram 160 may send $X_1$ number of packets at a relatively high priority before sending $Y_1$ number of packets at a relatively low priority. In this manner, service is granted to the higher priority packets (X) before that of the lower priority packets (Y). However, to prevent undue accumulation of lower priority packets, the forwarding module will grant transmission of lower priority packets on a fixed or round-robin scheme. Possibly after a series by which higher priority packets are sent followed by lower priority packets, even lower priority number packets may be sent, those packets indicated as $Z_1$, $Z_2$, and $\alpha_1$ packets. Reference 160 illustrates one of possibly numerous examples by which a forwarding module decides which packets to be sent across the shared resource depending on the priority code assigned to those packets. A relatively fair selection process should be used so as to evenly service incoming packets with greater deference given to higher priority packets. If, for example, packets arrive at the highest level of priority (N+M) as shown by dashed line 162, then possibly only those packets and no other packets will be serviced by the forwarding module. In this case, the lower priority packets will merely accumulate on the forwarding module input buffer until all of the highest priority packets have been serviced.

A problem may exit when forwarding packets of varying lengths. A rather long packet may take a longer time to transmit through a module after it has begun its transmission. If the next packet is of higher priority, it may be necessary to hold of f (i.e., suspend) transmission of the existing, longer yet lower priority packet. In this manner, stalling the higher priority packet is prevented. Added to the trailer information of the current transmitted packet may be priority information applicable to the following packet. An intermediate node or module can therefore use the trailer information while scheduling the next packet. If a long packet needs to be scheduled at a lower priority and the incoming packet indicates that there is a high priority packet to follow, the node can hold off sending the lower priority longer packet, including the current packet. Each intermediate node can update the next-packet priority field of the trailer.

Priority code in the present structural network can be assigned on a packet-bypacket basis not only for the existing packet but possibly also for subsequent packets. The priority code can be assigned based on the origination address, destination addresses, or on the structural configuration. Thus a packet can be assigned a high priority within its own level and a lower priority at other levels. This can be achieved by setting a bit in the control word notifying a level change intermediate module such as A1 of FIG. 12 to change the priority when traveling outside the loop. Alternatively, priority code could be assigned with various fields, each field defining the priority at a given level.

Figure 19:
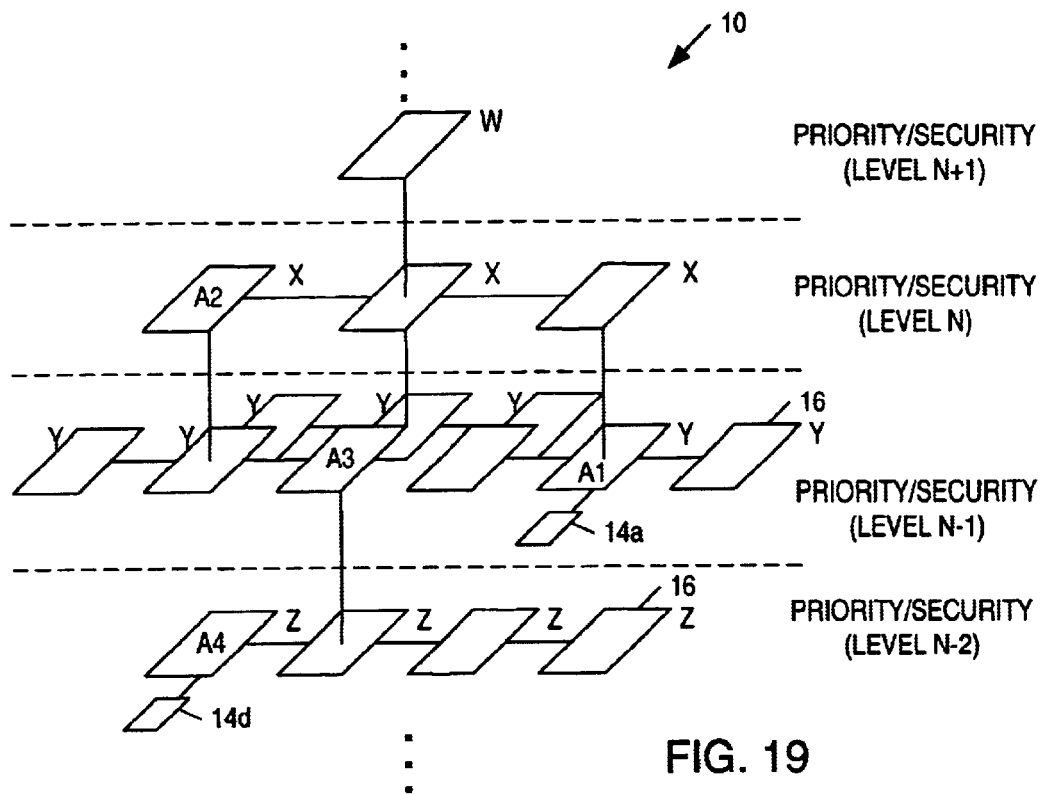
FIG. 19 is a logical diagram of nodes and associated modules arranged within levels, each level indicating a field of security code bits and/or priority code bits unique to modules within that level.

FIG. 19 illustrates the hierarchical nature by which priority codes and security codes can be assigned. In network 10 of FIG. 19, four levels of possibly numerous hierarchical levels are shown. Modules 14 are each configured with a unique identification number within a field of bits applicable to that module's level. In particular, the identification number is different within only one field attributed to modules X, and the identification number is different within another field attributed to modules Y, etc. All other fields are don't care fields, or are irrelevant for comparing within that level. In the example shown in FIG. 19, communication from termination device 14a to 14d is forwarded to a series of compare operations. If the comparison does not yield a match, then it is determined that the packet must be forwarded from module A1 in level N−1 to the next higher level. When a compare of fields N+1 and higher yields a match, the match is then checked against all nodes at that level and forwarded to the appropriate module identification number (e.g., module A2) that yielded a match in level N. It is known that termination device 14a is coupled to module Al and therefore decode need not take place at level N−1. Secondly, another decode must occur at the next higher level N+1 to determine if the address forwarded from termination device 14a is to be routed to a module in level N+1. If the comparison does not yield a match, then it is known that the routing need not occur to the next highest level. The routing algorithm performs a comparison of the next lower level. Knowing the highest level of routing is currently at modules X within level N, the next comparison of the packet address is performed on modules Y in level N−1. If a match results, then the match is identified as a particular module (e.g., module A3). The comparison or decode process continues onto the next lower level, level N−2, to determine if further routing is needed. Eventually, routing will arrive on module A4 and, based on the address resolution protocol, it is known that termination device 14d is connected to module A4, and mapping is used to forward the packet to the appropriate termination device 14d among possibly numerous termination devices connected thereto.

FIG. 19 illustrates the relatively simplistic decoding algorithm used to forward packets across the network according to hierarchical levels. Use of hierarchical levels and arrangement of identification numbers in those levels parallels with the arrangement of priority codes and security codes also within those levels. More specifically, certain classes or groups of modules have an interrelationship either in use or geography. For example, all modules in level N−2 are those which forward communication to cities within Texas, and modules within level N−1 are those which forward communication to cities within the United States, and so forth as a geographic example of the hierarchical classes or levels.

Figure 20:
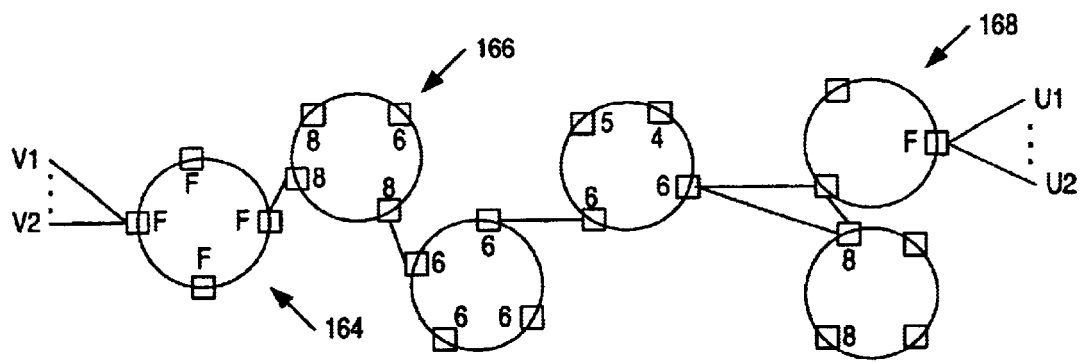
FIG. 20 is a diagram of a node or several nodes arranged in a multi-loop, wherein each module of each loop may have a specified priority code assignment for packets which traverse the module, and wherein each module which links two or more modules grants mastership to an incoming packet based on an arbitration scheme.

As shown in FIG. 20, each module within a particular level may have a priority code unique to that level. Also, as shown, priority code can be assigned different for differing users. Packets derived from user V1 may have a higher transmission priority than packets derived for user V2. Similarly, packets sent to user U1 may be assigned a higher priority than packets sent to user U2, etc. It is noted that the hierarchical nature of priority codes, user dependency of priority codes, and the source and destination dependency of priority codes are also applicable to the security codes as described above. Thus, the example of FIG. 20 is equally applicable to security codes. The modules indicated with a "F" priority designator are those possibly at the highest priority level. In the example shown, four bits may be all that is needed to indicate all the various levels of priority. Loop 164 is illustrative of a local loop having the highest priority level to ensure that any packets sent between modules on that loop will be given priority to any incoming packets onto that loop. This may provide for high speed video teleconferencing among termination devices connected on, for example, a LAN. Loop 166 illustrates interconnected modules having dissimilar priority codes stored in the wrap portion of their buffers. Any packets arriving on those modules will be forwarded with the priority code of that module to the next module within the loop or to an interconnected loop. Loop 168 is shown having a high priority module "F" that matches with high priority modules in loop 164. This signifies a high priority data path across the interconnected loops from each of those modules if communication is so desired.

It will be appreciated to those skilled in the art having the benefit of this disclosure that the various embodiments hereof are believed to be capable of performing classes of service as it pertains to giving priority to packets and securing those packets. Nodes are programmed to send or accept data originating from or addressed to specific nodes only. This allows for private line type security, however, on a packet-by-packet basis. The entry module achieves security identification and the exit module performs authorization based on a comparison of the security code to the originating identification number. The various nodes of the network can be programmed to only pass certain classes of messages based again on classes of originating security codes and/or originating identification numbers. This enables confidential data transmission with a specified integrity of service. Each node can be programmed to log data access information based on either the identification numbers traversed or the embedded packet address. The security services are provided in hardware and augments any conventional (outside the structured network) addressing scheme without using typical firewall security devices, and can be employed either with or without encryption. The security code applied to each packet works with the hierarchical structure and decoding mechanism of the network. Each level of hierarchy can have certain ranges of addresses reserved for secure transmission. For example, the upper bits can be assigned to secure data transmission within a certain class or level, and nodes within that level can be configured to receive transmission from only nodes therein. It is possible to confine a node (or class of nodes) to only certain levels of hierarchy. Nodes can thereby be used in the public network and yet retain the security of the local loop. Multiple security levels can be enabled for the same node. To achieve this, a node can be assigned more than one module and therefore more than one security code, and the security assignment for an outgoing packet can be made up of a couple of internal algorithms. One such algorithm could be based on a source or originating identification number. Thus, a user with an originating identification number can have different levels of security from the user with a different identification number through the same node.

A skilled artisan having the benefit of the above description can also recognize features of a guaranteed QOS and, more specifically, a guaranteed worst-case response time through nodes of the structured network. The classes of service are packet-based, and the quality of service is determinative of availability, reliability, and response time. An incoming packet at an entry module is assigned a priority, similar to the security code. The priority is determined based on, for example, the address of the incoming packet or the identification number of the originating device and the amount of dynamic bandwidth available for that incoming packet. The determination is performed with a mapping table that contains non-default priority codes. The table can also maintain allocated bandwidth and available bandwidth for each specific incoming address. The assigned priority is carried with the packet within the header of that packet. The traffic manager within each module dispatches the incoming packet based on its priority. All intermediate pass-through modules and traffic managers include the priority of incoming as well as pass-through packets when dispatching those packets. Multiple levels of priority are supported and bandwidth is reserved for the highest priority levels. Similar to security, the priority scheme in modules of the network is hierarchical and it is possible for a packet to change priority as it moves through the hierarchical levels. This allows for flexible bandwidth allocation such as higher priority within a local loop and default, lower priority across the network or any combinations thereof. This is possible since the present network is a structured, hierarchical network.

What is claimed is:

1. A communication network, comprising:

at least one intermediate module linked between an entry module and an exit module;

wherein said entry module is coupled to assign and transfer a security code and an identification number to a packet of data, and wherein said entry module comprises;

a decoder;

a storage device configured with a set of bits;

an entry compare unit coupled between the decoder and the storage device for comparing the identification number with the set of bits to determine if the packet of data will be transferred to the communication network as a secured packet having the security code and the identification number within a header of the packet, and wherein the secured packet further includes a trailer that include:

a first grouping of bits reserved for a count number of the number of intermediate modules through which the secured packet traverses;

a second grouping of bits reserved for an identifying number of each intermediate module traversed; and an exit compare unit within the exit module coupled to compare the security code and the identification number before transferring the packet of data from the communication network.

2. The communication network as recited in claim 1, wherein said identification number is a unique number attributed to the entry module.

3. The communication network as recited in claim 1, wherein said identification number is a unique number attributed to a termination device operably linked to the entry module.

4. The communication network as recited in claim 3, wherein each of said intermediate modules comprises:

a storage device containing a module security code; and an intermediate compare unit coupled to receive the secured packet and compare the security code against the module security code to define a secured path through the communication network.

5. The communication network as recited in claim 4, wherein the secured path is one that extends through the intermediate modules, each of which is assigned a set of bits which matches a set of bits within the security code.

6. The communication network as recited in claim 4, wherein the secured path is one that extends through the intermediate modules, each of which is assigned a set of bits which is of equal or greater value to a set of bits within the security code.

* * * * *